United States Patent [19]

Ackley

[11] Patent Number: 5,539,191
[45] Date of Patent: Jul. 23, 1996

[54] METHOD AND APPARATUS FOR DECODING UNRESOLVED BAR CODE PROFILES USING EDGE FINDING CIRCUITRY

[75] Inventor: H. Sprague Ackley, Seattle, Wash.

[73] Assignee: Intermec Corporation, Everett, Wash.

[21] Appl. No.: 493,669

[22] Filed: Jun. 22, 1995

[51] Int. Cl.$^6$ ................................................. G06K 7/10
[52] U.S. Cl. ........................... 235/462; 235/463; 235/470
[58] Field of Search ..................................... 235/462, 463, 235/470

[56] References Cited

U.S. PATENT DOCUMENTS

| | | |
|---|---|---|
| 1,985,035 | 12/1934 | Kermode et al. . |
| 2,612,994 | 10/1952 | Woodland et al. . |
| 3,359,405 | 12/1967 | Sundblad . |
| 3,622,758 | 11/1971 | Schanne . |
| 3,784,792 | 1/1974 | Dobras . |
| 3,909,594 | 9/1975 | Allais et al. . |
| 4,013,893 | 3/1977 | Hertig . |
| 4,056,710 | 11/1977 | Shepardson et al. . |
| 4,335,301 | 6/1982 | Palmer et al. . |
| 4,379,224 | 4/1983 | Engstrom ............................. 235/463 |
| 4,687,942 | 8/1987 | Takagi et al. ......................... 250/556 |
| 4,916,298 | 4/1990 | Raphaël ................................ 235/463 |
| 4,980,544 | 12/1990 | Winter ................................. 235/436 |
| 5,080,456 | 1/1992 | Katz et al. ........................... 359/214 |
| 5,097,263 | 3/1992 | Delpech et al. ...................... 341/155 |
| 5,229,591 | 7/1993 | Heiman et al. ....................... 235/462 |
| 5,231,293 | 7/1993 | Longacre, Jr. ....................... 250/568 |
| 5,268,562 | 12/1993 | Lazaridis ............................. 235/462 |
| 5,276,315 | 1/1994 | Surka ................................... 235/462 |
| 5,376,780 | 12/1994 | Klueter ................................. 235/462 |
| 5,389,770 | 2/1995 | Ackley .................................. 235/462 |

FOREIGN PATENT DOCUMENTS

| | | |
|---|---|---|
| 0262924 | 4/1988 | European Pat. Off. . |
| 0385783 | 9/1990 | European Pat. Off. . |
| WO88/02521 | 4/1988 | WIPO . |

OTHER PUBLICATIONS

"Report on Unsymmetrical Signals in the Supermarket Scanner," interoffice memorandum, Intermec Corporation, Everett, WA, Jan. 21, 1970.

"Verification—New Insight for an Old Debate," Scan–Tech '87, interoffice memorandum, Intermec Corporation, Everett, WA, Oct. 13, 1987.

Barkan, Eric and David Sklar, "Effects of substrate scattering on bar–code scanning signals", *SPIE* 362:196–212, 1982.

*Bar Code Print Quality—Guideline*, American National Standards Institute, New York, NY, 1990, pp. 1–29.

Barkan, Eric and Jerome Swartz, "Depth of modulation and spot size selection in bar code laser scanners," in *Proceedings of SPIE's 25th Annual International Technical Symposium and Exhibit*, Int'l. Society for Optical Engineering, San Diego, CA, Aug. 24–28, 1981.

Ackley, Sprague, *Verification—New Insight for an Old Debate*, Scan–Tech '87, Intermec Corporation, Oct. 13, 1987.

*Primary Examiner*—Harold Pitts
*Attorney, Agent, or Firm*—Seed and Berry

[57] ABSTRACT

A method and apparatus for decoding profiles which fail to resolve narrow elements in symbologies employing one element type having only a single width, first begins by producing a series of counts from the symbol using standard waveshaping and counting circuitry. Second, an X-dimension for the 1-wide elements is determined based on the first few counts corresponding to bars after the counts corresponding to the quiet zone. The Start and Stop characters are located and the method determines whether the symbol is in focus. If the symbol is out-of-focus, then groups of an odd number of 1-wide elements are converted to large counts that correspond to pseudo elements (e.g., wide bars in a symbology containing only 1-wide narrow bars). The method groups counts into individual characters, and divides all pseudo elements into individual 1-wide elements. The method thereafter decodes the symbol.

21 Claims, 12 Drawing Sheets

Fig. 16B ical signals from an optical-electric transducer into a series of timing counts which mimic the widths of the bars and spaces. Consequently, either a typical reader could not decode out-of-focus profiles, or the waveshaping circuit had to be replaced with an analog to digital converter, a more powerful microprocessor and software to perform the method under the '770 patent.

METHOD AND APPARATUS FOR DECODING UNRESOLVED BAR CODE PROFILES USING EDGE FINDING CIRCUITRY

TECHNICAL FIELD

The present invention relates to methods and apparatus for decoding bar code symbols and, more particularly, to decoding symbols that are unresolved or out-of-focus.

BACKGROUND OF THE INVENTION

Methods of decoding bar codes are well known in the art and generally employ "waveshaping" circuits to find the edges or transitions in reflectance signals produced from bar code symbols. A reflectance signal or bar code "profile" is generally an analog signal representing the modulated light reflected from areas of high reflectance, or "spaces," and absorbed by areas of low reflectance, or "bars," in a bar code symbol, and thereby represents the pattern of bars and spaces in the symbol. In a given profile, a peak generally corresponds to a space (high reflectivity), while a valley corresponds to a bar (low reflectivity, relative to the space), and the width of each peak or valley generally indicates the width of the corresponding bar or space whose reflectance produced the peak or valley. Most waveshaping circuits essentially square off the profile based on transitions or edges between peaks and valleys in the profile. Counting circuits then produce a series of counts that indicate the widths of the bars and spaces.

A simple waveshaping circuit is described in U.S. Pat. No. 3,909,594 to Allais et at., while a more complex waveshaping circuit is described in U.S. Pat. No. 4,335,301 to Palmer et al. These and other waveshaping circuits utilize many different schemes to realize the same goal, that is, to separate the signals emanating from the bars and the spaces and to determine the duration of the signals. Finding edges in profiles was described generically in an article from Scan-Tech proceedings 4A in 1987, "Verification - New Insight for an Old Debate." In general, waveshaping circuits fall into one of three types: (1) simple voltage following circuits, (2) circuits which find the second derivative of the profile, and (3) circuits which determine a "global threshold" by utilizing information from wider elements.

An "element" is a single bar or a single space. Therefore, in a 2-width symbology such as Code 39, each symbol character generally includes a combination of two narrow and two wide elements: a single-width bar, a single-width space, a double-width bar and a double-width space. More complex symbologies employ a greater number of widths for bars and/or spaces.

In all waveshaping circuits in use today, when the profiles are out-of-focus, the narrow elements are not all resolved, and the circuits fail to provide enough information to decode the symbol. This drawback was overcome in the inventor's U.S. Pat. No. 5,389,770, entitled "Method and Apparatus for Decoding Unresolved Bar Code Profiles." The inventor discovered that if a bar code reader ("reader") scans or images a bar code symbol out of its depth-of-field, the resulting profile will exhibit "closure." Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or a bar is "resolved" if the reader is able to identify a peak or valley in the profile that corresponds to the given space or bar, and the width of that element. Some profiles may represent narrow elements by small peaks, valleys or ripples that are visually recognizable, but which are essentially undetectable by current waveshaper circuits.

The inventor's apparatus and method embodied in U.S. Pat. No. 5,389,770, ("the '770 patent") converts the profile into a multi-level digital signal that is stored and analyzed in memory. A microprocessor identifies the higher peaks and lower valleys in the digitized profile, bounds the peaks and valleys as resolved elements and identifies potential wide elements (e.g., 2-wide bars and spaces). The microprocessor verifies the wide elements and then measures distances between these wide elements. The microprocessor analyzes the profile and the measured distances, including start or stop characters, to determine a unit distance or X-dimension from the profile.

The "X-dimension" is the nominal width dimension of the narrowest bars and spaces in a bar code symbology. The wider bars and spaces in that symbology are based on integer multiples of the X-dimension. Based on the unit distance, the microprocessor constructs a matrix for determining the number of narrow elements unresolved or "lost" between resolved wide elements. Based on the measured distances between resolved elements, all of the unresolved narrow elements are identified and the profile is subsequently decoded.

A drawback to the method under the '770 patent is that a microprocessor faster than those employed in typical readers is required to quickly decode a symbol. Another drawback is that the method requires the profile to be converted into the multi-level digital signal. Typical readers use waveshaper and timing circuits to convert analogue electr

SUMMARY OF THE INVENTION

The present invention recognizes that most standard bar code symbologies encode information in both the bars and the spaces. Consequently, when the narrow elements are unresolved, the profiles generated therefrom have three distinct reflectance regions: (1) the resolved spaces which are high in reflectance, (2) the closure region which is medium in reflectance, and contains unresolved narrow elements, and (3) the resolved bars which are low in reflectance. If a symbology were used whereby the number of reflectance regions encountered in an unresolved state were reduced to two, simple waveshaping circuits and slower microprocessors could once again be used to decode unresolved profiles under typical readers.

The present invention describes a method and apparatus for decoding unresolved bar code profiles where the profile is generated from certain bar code symbologies. Specifically, the present invention is particularly adapted for use with symbologies employing either all narrow bars or all narrow spaces. With no wide elements of a particular type, standard waveshaping circuits interpret groups of unresolved elements as wide elements of the same type. For example, in a symbology employing only narrow bars, standard waveshaping circuits interpret groups of narrow bars and spaces in an unresolved profile from the symbology as wide bars. Consequently, a standard waveshaping circuit is able to retrieve enough information from the profile to allow a simple microprocessor to successfully decode the unresolved profile.

In a broad sense, the present invention embodies a method of decoding a machine-readable symbol representing encoded information, the symbol having a plurality of relatively spaced two-dimensional geometric shapes of first and second types. The shapes of the first type have a first reflectance and the shapes of the second type have a second reflectance that differs from the first reflectance. The shapes of the first type have a first width in at least one direction, and the shapes of the second type have the first width and at least a second width in the one dimension. The second width is greater than the first width.

The method of decoding the symbol includes the steps of: (a) receiving light reflected from the symbol and producing an output signal therefrom that represents the reflectance of the shapes of the first and second types comprising the symbol; (b) receiving the output signal and producing a count signal that identifies at least some of the shapes of the second type having the second width and which falsely identifies at least one group of the shapes of the first and second type having the first width as a pseudo shape of the second type, which has a total width approximately equal to a sum of the first widths of the first group; (c) receiving the count signal and dividing the one group falsely identified as the pseudo shape of the second type into shapes of the first and second type; and (d) determining the information encoded in the symbol based on the count signal and the divided one group.

The present invention also embodies an apparatus for decoding the machine-readable symbol. The apparatus includes an electro-optical transducer that receives light that is reflected from the machine-readable symbol and produces an output signal therefrom that represents the reflectance of the shapes and spaces comprising the symbol. Count generating circuitry coupled to the electro-optical transducer receives the output signal and produces a count signal that identifies at least some of the shapes of the second type having the second width, and which falsely identifies at least one group of the shapes of the first and second type having a first width as a pseudo shape of the second type, which has a total width approximately equal to a sum of the first widths of the one group. A processor coupled to the count generating circuitry processes the count signal and produces a signal indicative of the information encoded in the symbol. The processor receives the count signal and divides the one group falsely identified as the pseudo shape of the second type into shapes of the first and second type. The processor determines the information encoded in the symbol based on the count signal and the divided one group.

Other features and associated advantages of the present invention will become apparent from studying the following detailed description, together with the accompanying drawings.

BRIEF DESCRIPTION OF THE DRAWINGS

FIG. 14A is a series of timing counts produced by the reading apparatus of FIG. 1 based on the profile of FIG. 3, as the reading apparatus scans the profile from left to right.

FIG. 14B is a series of timing counts produced by the reading apparatus of FIG. 1 based on the profile of FIG. 3, as the reading apparatus scans the profile from right to left.

FIG. 16A is a series of timing counts produced by the reading apparatus of FIG. 1 based on the profile of FIG. 11, as the reading apparatus scans the profile from left to right.

FIG. 16B is a series of timing counts produced by the reading apparatus of FIG. 1 based on the profile of FIG. 11, as the reading apparatus scans the profile from right to left.

DETAILED DESCRIPTION OF THE PRESENTLY PREFERRED EMBODIMENTS OF THE INVENTION

Figure 1:
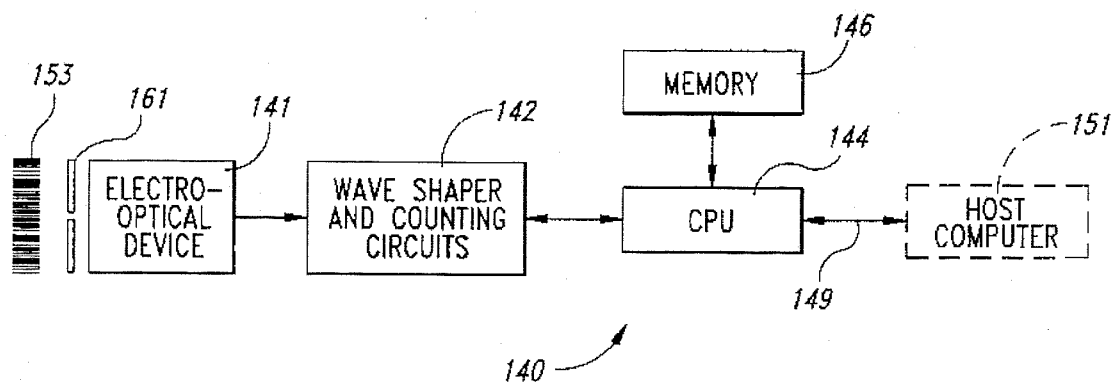
FIG. 1 is a block diagram of a bar code symbol reading apparatus of the present invention.

Referring to FIG. 1, a bar code reading apparatus 140 includes an electro-optical device 141 such as a laser scanner, rasterizing laser, or wand-based optical transducer. The electro-optical device 141 receives light reflected from a data collection or bar code symbol 153 through an aperture 161 and produces an analog electrical signal or analogue profile (or "profile" for short). As used herein, a "data collection symbol" refers to a symbol from linear, stacked, area and other machine-readable symbologies, but a symbology which preferably includes one element type (bar or space) having a single width, while the other element type has a variable width (a "single width symbology"). Alternatively, the electro-optical device 141 can include a 1- or 2-dimensional CCD, semi-conductor array, vidicon, or other area imager capable of converting received light into electrical signals. The electro-optical device 141 can also include a light source such as an LED, flashbulb, infrared light source, or other light-emitting element.

Waveshaper and counting circuits 142 receive the analog electrical signals from the electro-optical device 141 and produce count signals. As explained above, waveshaper circuits and counting circuits are well known in the art, and those skilled in the art may select from any such circuits that can be used with the present invention. The waveshaper and counting circuits 142 can be collectively referred to as a timing count generator that converts the analog electrical signal from the electro-optical device 141 into a string of counts that reflect the width of bars and spaces as imaged by the electro-optical device 141. The count signal, discussed more fully below, is input to a central processing unit ("CPU") 144. A memory 146 coupled to the CPU 144 stores data for the CPU, including the below-described routine under the present invention. The CPU 144 processes the count signal and outputs data encoded in the symbol or other information to a host computer 151, or other apparatus or applications, by a port or line 149.

As noted above, the present invention preferably employs a single-width symbology. Several single width symbologies are known in the art, for example, 2 of 5 code and BC412. BC412 is described in detail in U.S. Pat. No. 5,380,998 to Bossen et al. BC412 can be decoded under the present invention, but has several drawbacks. For example, BC412 can occasionally be decoded as a valid symbol from another symbology such as Code 39, Interleaved 2 of 5, and Codabar (i.e., suffers from "autodiscrimination errors"). BC412 is also prone to reading sub-segments of the symbology, called "short scans", where portions of a given symbol are validly decoded, but the whole symbol itself is not fully decoded. BC412 can be reliably decoded using the methods of the present invention if the reader 140 is programmed to decode only BC412 and to decode only symbols having a predetermined number of symbol characters.

2 of 5 code similarly suffers from many of the same drawbacks as BC412, but to a lesser degree because 2 of 5 code uses a 3-bar and 3-space start and stop characters as opposed to a single bar start character used in BC412. Start and stop characters having six elements allows a reader to more readily recognize the beginning and end of a symbol to thereby avoid short scans. 2 of 5 code, however, has less information density and has a substantially weaker error detecting scheme than BC412. Consequently, the preferred symbology employed by the methods and apparatus of the present invention is neither BC412 nor 2 of 5 code, but instead Code 53, which is described in detail in the inventor's U.S. patent application Ser. No. 08/433,835, filed May 4, 1995. Code 53 has the advantages of high information density, a full character set, robust start and stop characters, a strong error detecting scheme and a means for detecting the focus state of the reading apparatus.

Code 53 is a typical "bar code symbology" which can be referred to as a "linear symbology" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. Data characters include not only human readable characters, but also special function characters such as start or stop characters. Each unique group or pattern of bars and spaces within a predetermined width defines a particular symbol character, and thus a particular data character or characters. A given linear symbol or "bar code symbol" (or "symbol" for short) encodes several data characters along its length as several groups of unique bar and space patterns.

Figure 2:
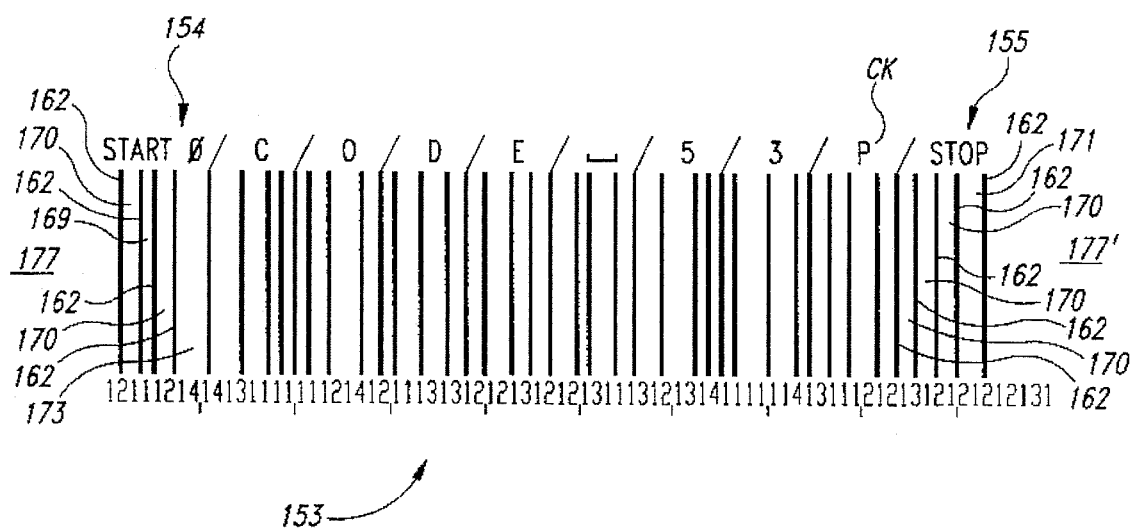
FIG. 2 shows a Code 53 symbol from the preferred symbology of the present invention, which has bars of a single element width, with corresponding element widths listed below the symbol.

An exemplary Code 53 symbol 153 is depicted in FIG. 2. The symbol 153 encodes the data characters "C", "O", "D", "E", "space", "5", "3", a "Start 0" character 154, a modulus 53 check character CK (equal to the data character "P") and a "Stop" character 155. The symbol 153 shows each symbol character, which has four bars and four spaces, delineated by way of a diagonal mark at the top of the character, extending away from the last space of the character, which is added herein for the purposes of illustration. The data characters for the symbol 153 are shown above their corresponding symbol character. The widths of the elements in the symbol 153 are shown below as a string of digits sequentially representing the widths of the elements in the symbol from left to right. The widths of the elements are shown as groups of digits parsed into the widths for individual symbol characters by way of a comma, added for purposes of illustration.

Following a left side quiet zone 177, the first symbol character is the Start 0 character 154, which has the string of element widths of 12111214. In other words, the Start 0 character 154 includes the following string of elements: a 1-wide bar 162, a 2-wide space 170, a 1-wide bar 162, a 1-wide space 169, a 1-wide bar 162, a 2-wide space 170, a 1-wide bar 162 and a 4-wide space 173. Notably, all of the spaces are separated by 1-wide bars 162. (The "quiet zone" is a clear space, containing no dark marks, that precedes or follows a symbol.) The Start 0 character indicates that the symbol 153 is a member of the Code 53 symbology so that the reader 140 can automatically discriminate between the symbol 153 and symbols from other symbologies. "Autodiscrimination" typically refers to the ability of a bar code scanner or reader to recognize and correctly decode symbols from more than one symbology. As shown at the right side of the symbol 153, preceding a right side quiet zone 177', the stop symbol character includes the following string of spaces all separated by 1-wide bars 162: three 2-wide spaces 170 followed by a final 3-wide space 171.

The electro-optical device 141 of the reader 140 (FIG. 1) scans the symbol 153 (FIG. 2) to produce an analog profile such as shown in FIGS. 3 through 13, which represent the modulated light received from the symbol and the state of focus of the reader (based, e.g., on a size of the aperture 161). The vertical scale on the profile is percent reflectance ranging from 0% to 100%. The horizontal scale is not known absolutely, but rather is in relative units, such as distance across the symbol or time. When decoding a profile, it is not necessary to know the horizontal spacing in measurement units, but rather the relative widths or distances between the elements represented by peaks or valleys in the profile.

In most readers, the aperture 161 must be smaller than the minimum size of an element (i.e., the X-dimension) in a symbol to be read by the reader so as to produce a profile that adequately resolves all elements in the symbol. Most bar code readers employ a circular aperture 161 whose diameter is equal to approximately 0.8 times the X-dimension, or "0.8X."

Figure 3:
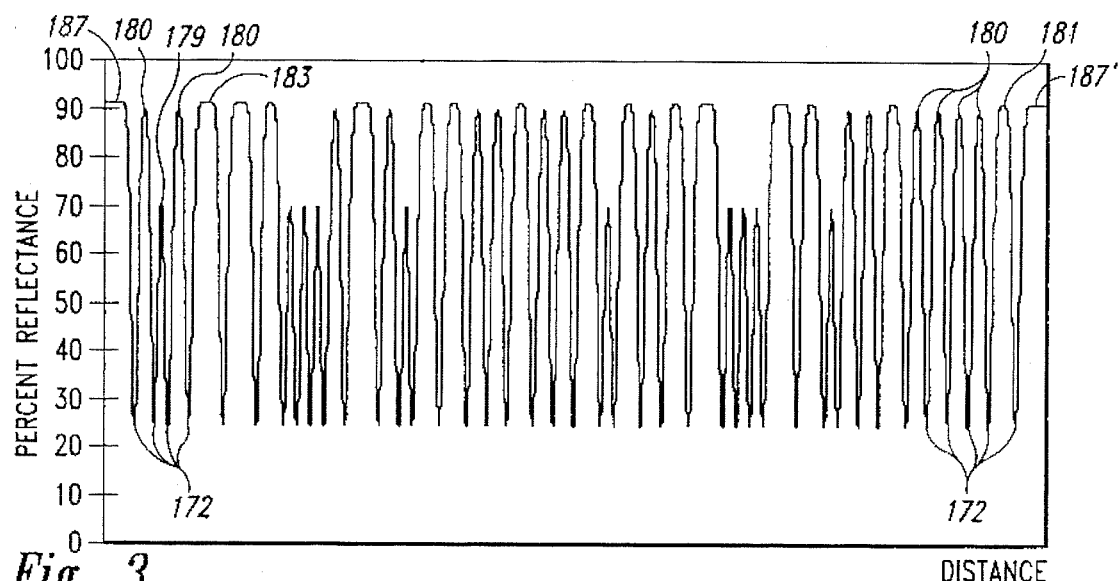
FIG. 3 is a bar code profile produced by the reading apparatus of FIG. 1 from the symbol of FIG. 2 where the aperture size is 1.2 times the X-dimension.
Figure 4:
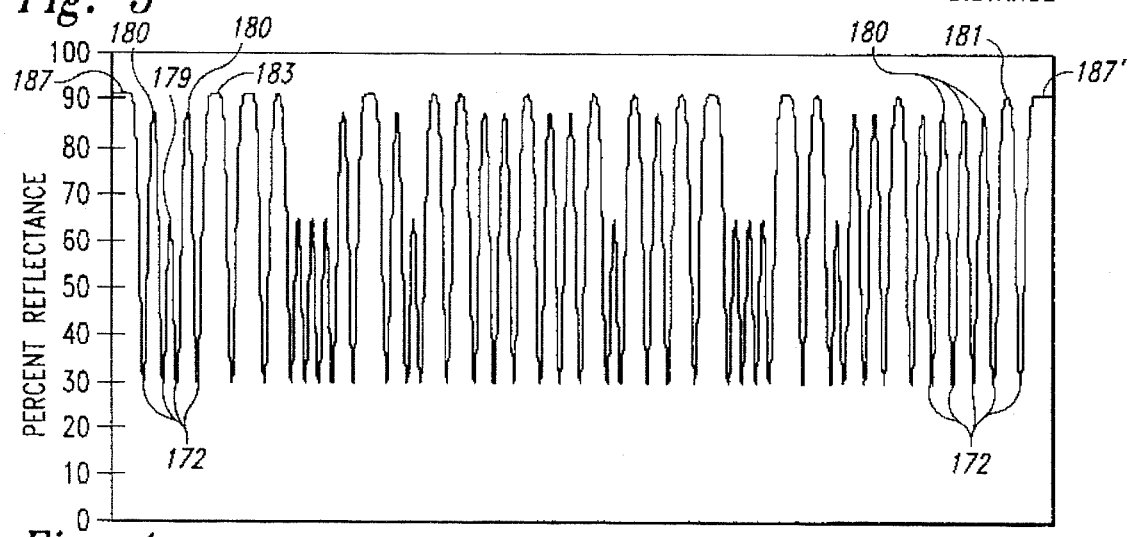
FIG. 4 is a bar code profile produced by the reading apparatus of FIG. 1 from the symbol of FIG. 2 where the aperture size is 1.4 times the X-dimension.
Figure 5:
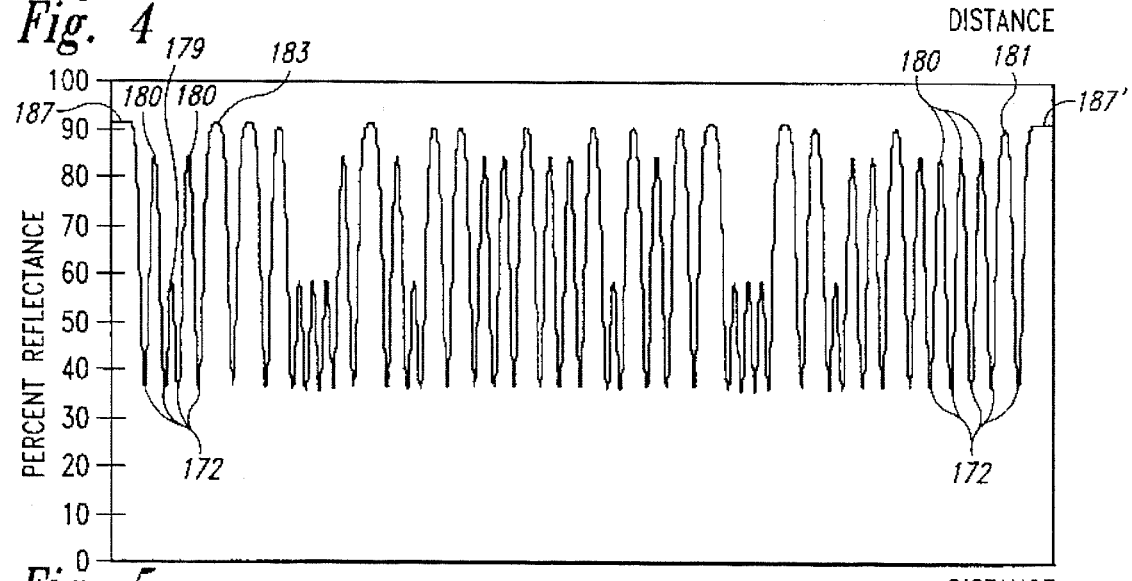
FIG. 5 is a bar code profile produced by the reading apparatus of FIG. 1 from the symbol of FIG. 2 where the aperture size is 1.6 times the X-dimension.
Figure 6:
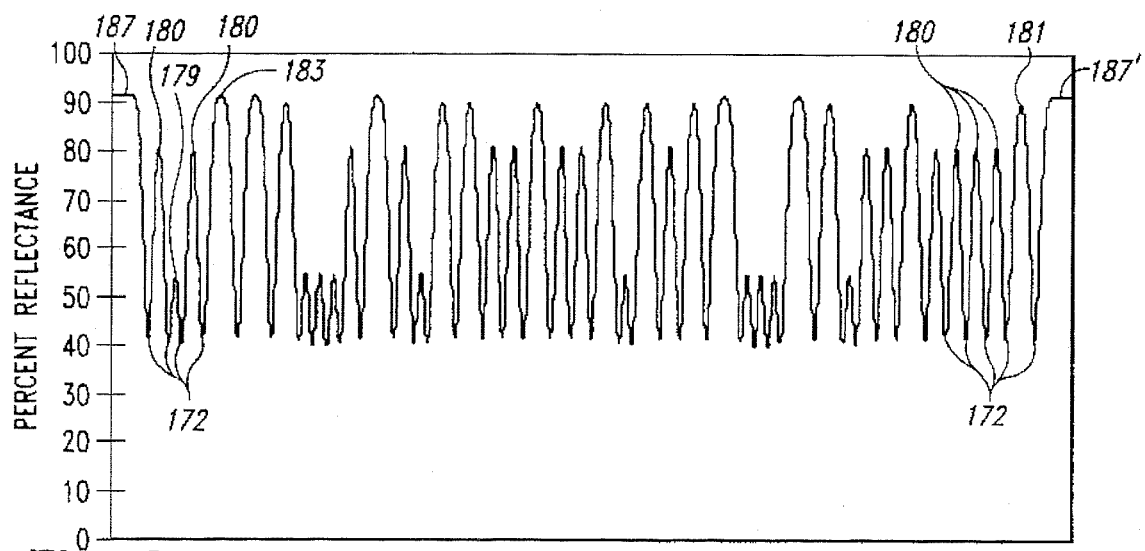
FIG. 6 is a bar code profile produced by the reading apparatus of FIG. 1 from the symbol of FIG. 2 where the aperture size is 1.8 times the X-dimension.
Figure 7:
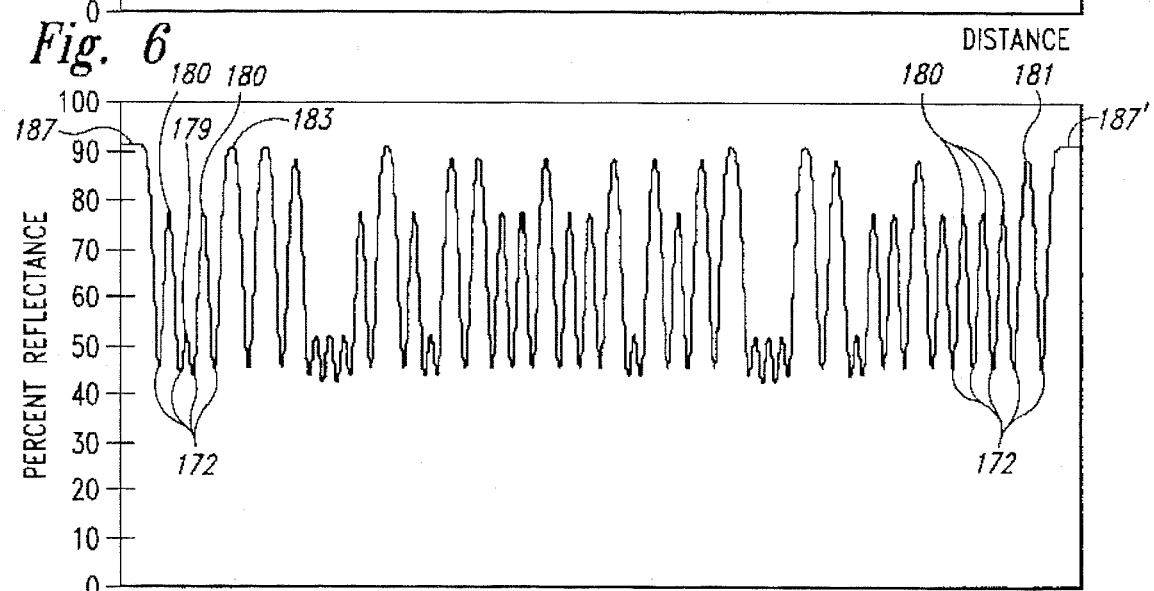
FIG. 7 is a bar code profile produced by the reading apparatus of FIG. 1 from the symbol of FIG. 2 where the aperture size is 2.0 times the X-dimension.
Figure 8:
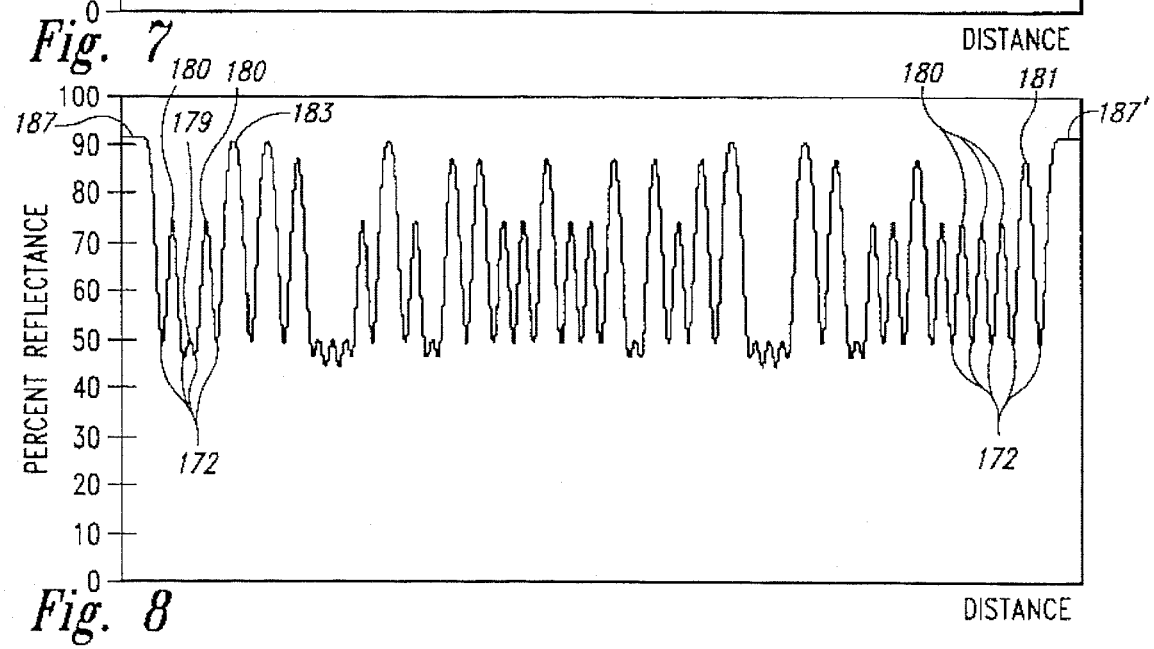
FIG. 8 is a bar code profile produced by the reading apparatus of FIG. 1 from the symbol of FIG. 2 where the aperture size is 2.2 times the X-dimension.

FIGS. 3 through 13 illustrate how the 1-wide elements in the symbol 153 become unresolved or "lost" in profiles produced by the electro-optical device 141 as the aperture 161 increases from 1.2X to 3.2X. FIG. 7 shows a somewhat resolved profile produced by the electro-optical device 141 from the symbol 153, where the aperture 161 is approximately equal to 1.2X. FIG. 3 is a somewhat resolved profile since not all of the peaks are of approximately equal amplitude.

Figures 14A, 14B:
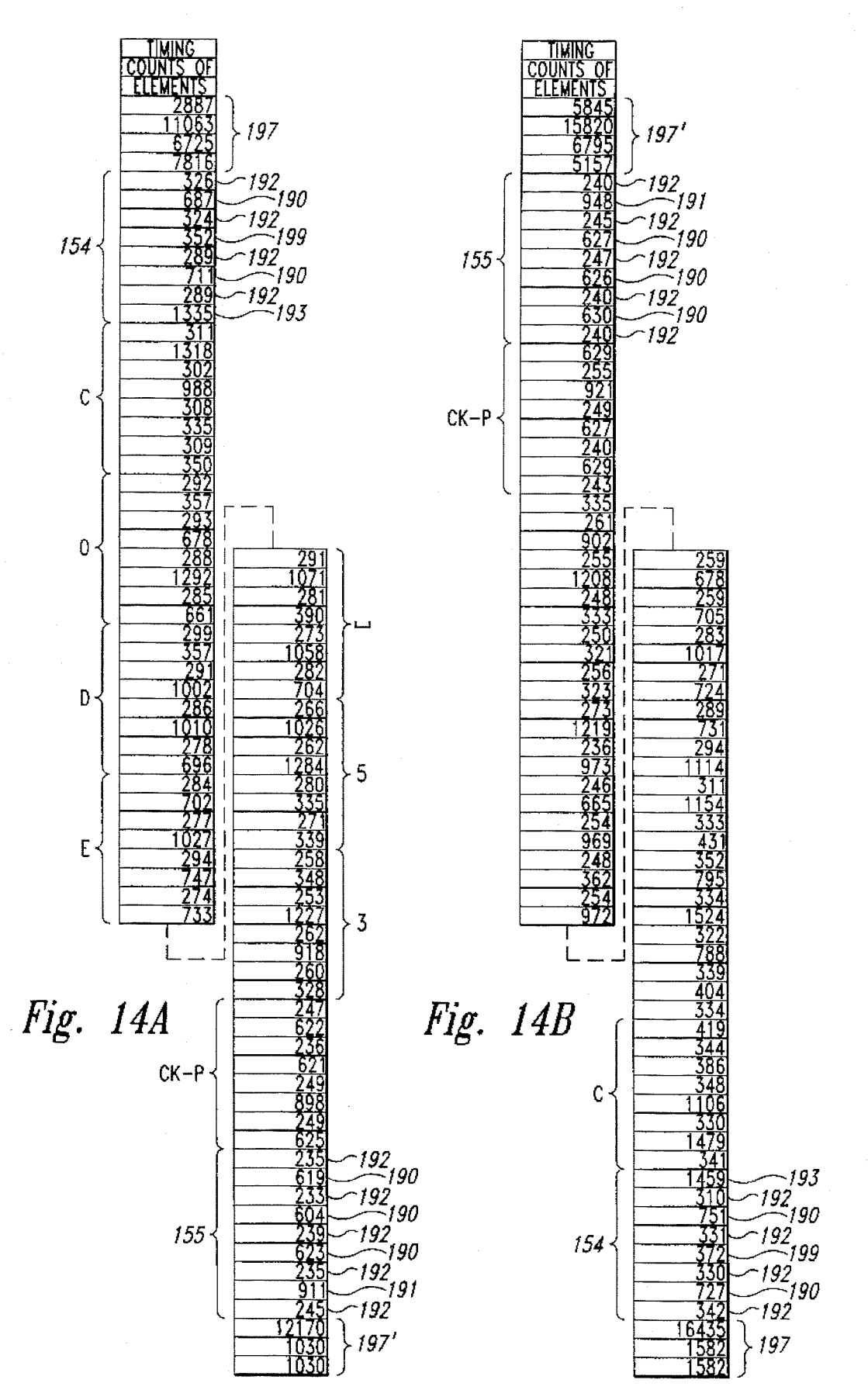

As shown in the profile of FIG. 3, the 1-wide bars 162 produce valleys 172 that all have less than 30% reflectance. Conversely, the 2-wide spaces 170, 3-wide spaces 171 and 4-wide spaces 173 produce peaks 180, 181 and 183, respectively, that each have a reflectance of at least 90%. The left and right quiet zones 177 and 177' produce respective peaks or constant signals 187 and 187' that also have approximately 90% reflectance. The 1-wide spaces 169 produce peaks 179 that have approximately 70% reflectance. Importantly, all of the valleys in the profile of FIG. 3 are distinct from all the peaks, and thus standard decoding circuitry such as the waveshaper and counting circuits 142 can likely locate the transitions from valleys to peaks in the profile and thereby produce a series of well-behaved counts, such as those shown in FIGS. 14A and 14B. As recognized from the discussion below, the series of counts in FIGS. 14A and 14B are "well-behaved" because elements having similar widths produce counts having similar values. By locating the transitions from valleys to peaks, the waveshaper and counting circuits 142 can identify the edges of each of the elements in the symbol 153 from the profile of FIG. 3, and thereby decode the symbol.

The profile of FIG. 3, however, is a theoretical profile, and therefore lacks noise and other signal processing problems that make it difficult, if not impossible, for typical waveshaper and counting circuits 142 to identify transitions between peaks and valleys. Typical profiles produced by apertures 161 having a size of 0.8X represent the 1-wide spaces 169 as peaks having reflectances substantially similar to the peaks produced by the wide elements (i.e., elements that are 2-wide or greater).

FIGS. 3 through 13 demonstrate that as the size of the aperture 161 in the reader 140 increases from 1.2X to 3.2X, and thus the symbol 153 becomes more out-of-focus, the 1-wide spaces 169 produce peaks 179 of decreasing amplitude. With an aperture 161 of about 2.2X, the profile shown in FIG. 8 just barely indicates the positions of the 1-wide bars 162 that border or define 1-wide spaces 169. In other words, as the symbol 153 becomes more out of focus, clusters of peaks 179 and valleys 172 produced by adjacent 1-wide bars 162 and 1-wide spaces and 169 tend to merge. As shown in the profiles of FIGS. 9 through 13, clusters of 1-wide spaces 169 and adjacent bars 162 simply produce large, flattened valleys 175 and 176, which are discussed more fully below.

Figure 12:
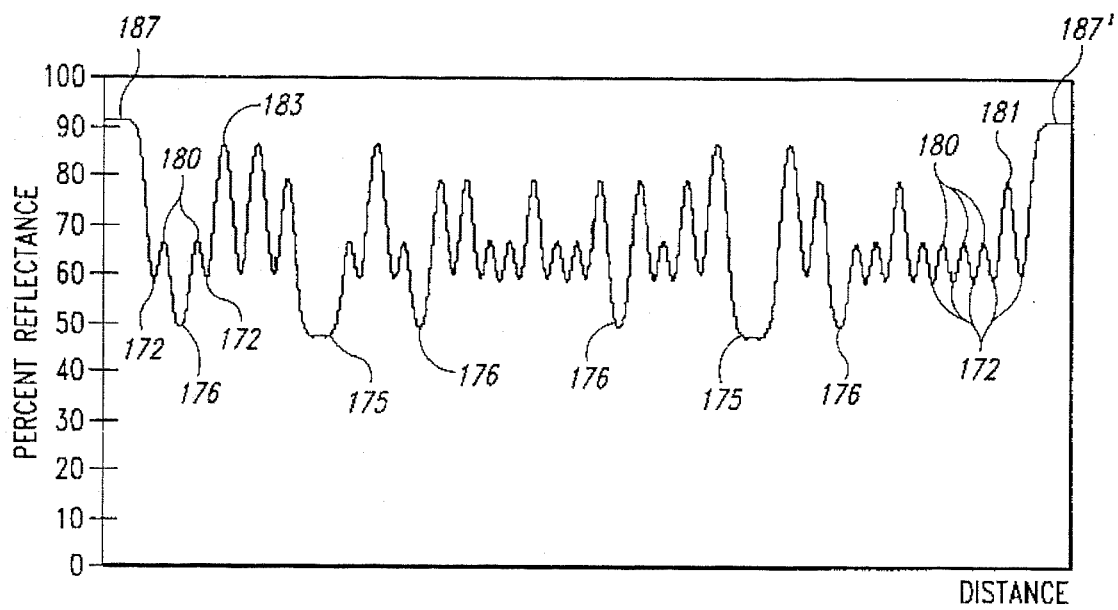
FIG. 12 is a bar code profile produced by the reading apparatus of FIG. 1 from the symbol of FIG. 2 where the aperture size is 3.0 times the X-dimension.
Figure 13:
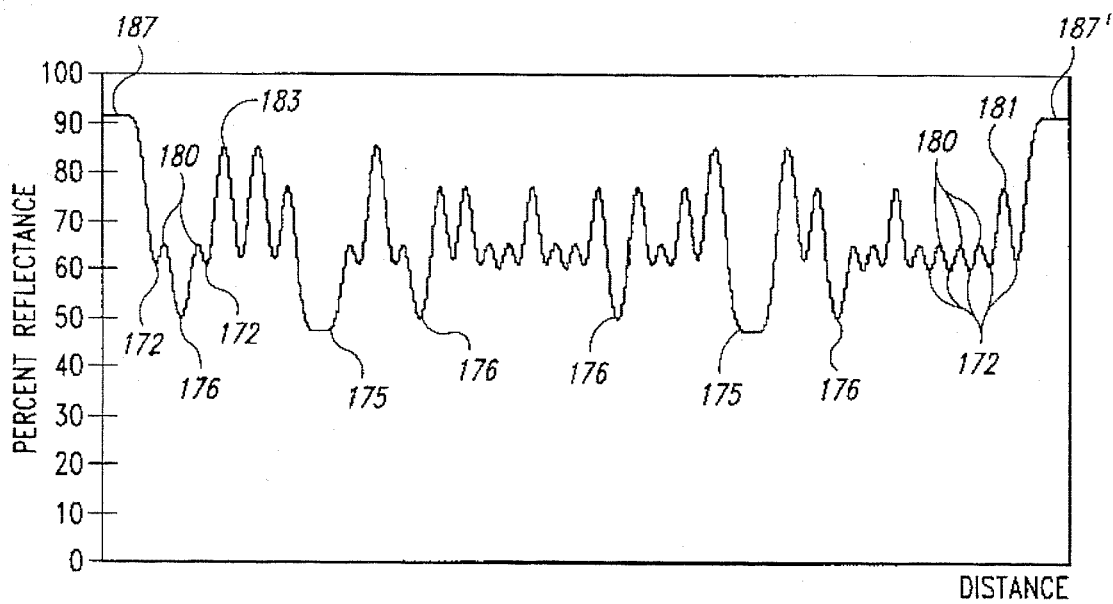
FIG. 13 is a bar code profile produced by the reading apparatus of FIG. 1 from the symbol of FIG. 2 where the aperture size is 3.2 times the X-dimension.

The profiles of FIGS. 6 through 13 are undecodable using standard waveshaper and counting circuits 142. The wide elements, e.g. the 2-wide, 3-wide and 4-wide spaces 170, 171 and 173, respectively, produce substantially high peaks 180, 181 and 183, respectively, that have significant contrast with the valleys 172. Importantly, the positions of all valleys and peaks for the wide elements and many of the narrow elements, (i.e. 1-wide elements) remain effectively constant as the aperture 161 in the reader 140 increases. In the profiles of FIGS. 12 and 13, as the aperture 161 increases to 3X and beyond, the peaks 180 produced by the 2-wide spaces 170 and the valleys 172 tends to diminish as the 2-wide spaces also become unresolved.

As is known, when the size of an aperture 161 increases, the depth-of-field decreases so that if the size of an aperture doubles, the depth-of-field is reduced approximately in half. The profiles shown in FIGS. 3 through 13, therefore, can also be used to demonstrate profiles that would be produced by the reader 140 having a fixed aperture 161 of 0.8X, but where the profiles are generated by the reader 140 from a slightly out-of-focus distance (FIG. 3) to a substantially out-of-focus distance of over twice as far (FIG. 13) for the symbol 153. The profiles of FIG. 3 through 13 may also be used to demonstrate a CCD-reader having two few pixels in its CCD array to adequately resolve a given image.

Noise and poor printing quality can also produce closure in profiles, unrelated to the optics in, or state of focus of, the reader 140. The state of focus of the reader 140 can be defined by a ratio of the size of the aperture 161 to the size of the narrow elements in the symbol 153 (i.e. X-dimensions). Most currently used waveshaping and counting circuits 142 can locate all of the elements and produce well behaved counts for aperture sizes less than 1.6X, although the reader 140 is slightly out-of-focus at 1.6X.

Considering first an in-focus example, the waveshaper and counting circuits 142, receiving the profile of FIG. 3 from the electro-optical device 141, produces a series of timing counts such as shown in FIG. 14A as the circuits process the profile from left to right. FIG. 14B shows a series of counts produced by the waveshaper and counting circuits 142 from a scan of the symbol 153 by the electro-optical device 141 in a right to left direction (a "reverse scan"). The waveshaper and counting circuits 142 convert the profile of FIG. 3 into a square wave signal and then produce a series of timing counts reflecting time intervals between transitions in the square wave signal. Therefore, the waveshaper and counting circuits 142 convert the valleys 172, produced by the 1-wide bars 162, into 1-wide bar counts 192 in FIGS. 14A and 14B that all have substantially the same value. The waveshaper and counting circuits 142 similarly produce 1-wide space counts 199, 2-wide space counts 190, 3-wide space counts 191 and 4-wide space counts 193 based on the peaks 179, 180, 181 and 183 respectively.

Referring to FIG. 14A for example, the waveshaper and counting circuits 142 produce 1-wide bar counts 192 in the Start 0 character 154 that range from 326 to 289. In the series of counts in FIGS. 14A and 14B (and in FIGS. 16A and 16B, discussed below), the counts produced from the 1-wide bars 162 are all referred to by the same reference numeral 192. Similarly, counts corresponding to elements of the same width are given the same reference numeral (e.g., the 2-wide spaces 170 produce 2-wide space counts 190).

For the Stop character 155, the waveshaping and counting circuits 142 produce 1-wide bar counts 192 that range from 235 to 245. The disparity between timing counts for 1-wide bars produced from the Start 0 character 154 and the Stop character 155 result from acceleration distortions. Acceleration distortions are generally produced when the reading beam is accelerated across the symbol 153 as the electro-optical device 141 produces the profile. Acceleration distortions are common in profiles generated by hand-held wand readers, but such distortions can occur in laserscanning and image-based readers.

Figure 9:
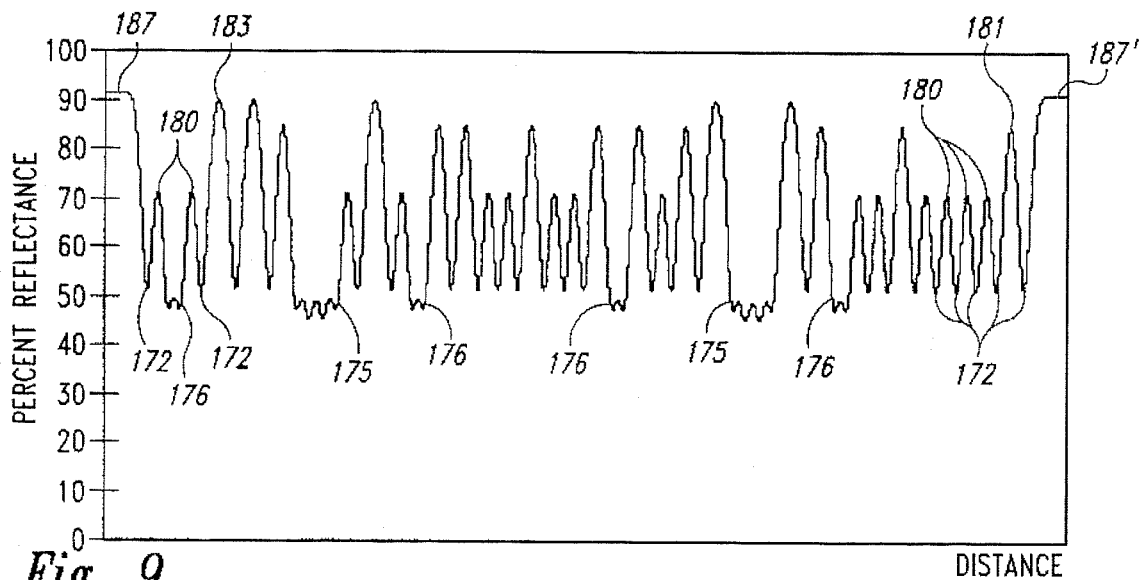
FIG. 9 is a bar code profile produced by the reading apparatus of FIG. 1 from the symbol of FIG. 2 where the aperture size is 2.4 times the X-dimension.
Figure 10:
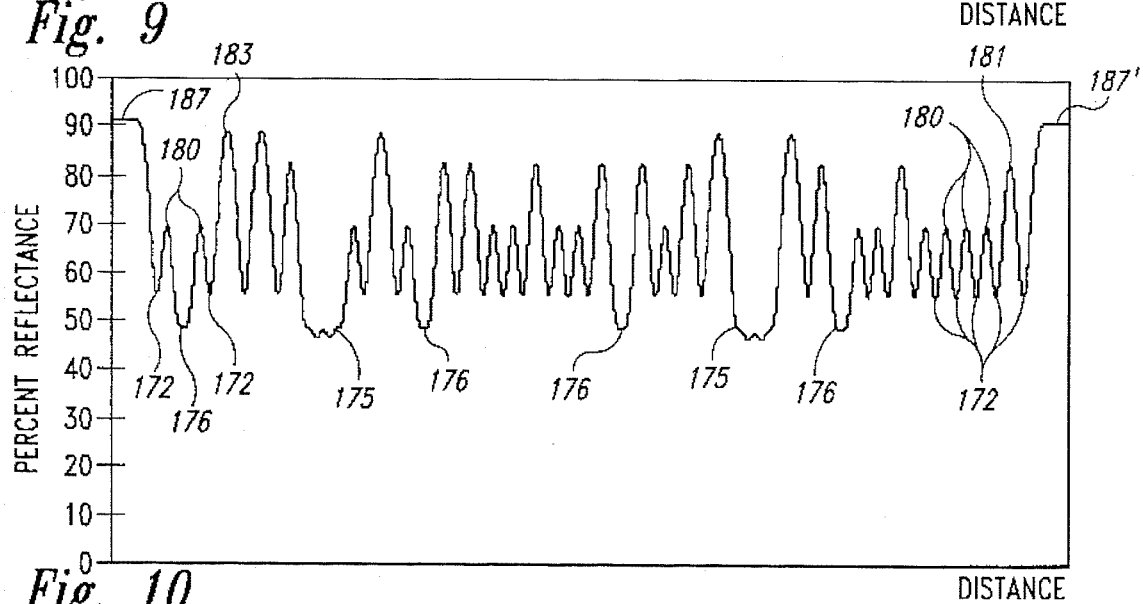
FIG. 10 is a bar code profile produced by the reading apparatus of FIG. 1 from the symbol of FIG. 2 where the aperture size is 2.6 times the X-dimension.
Figure 11:
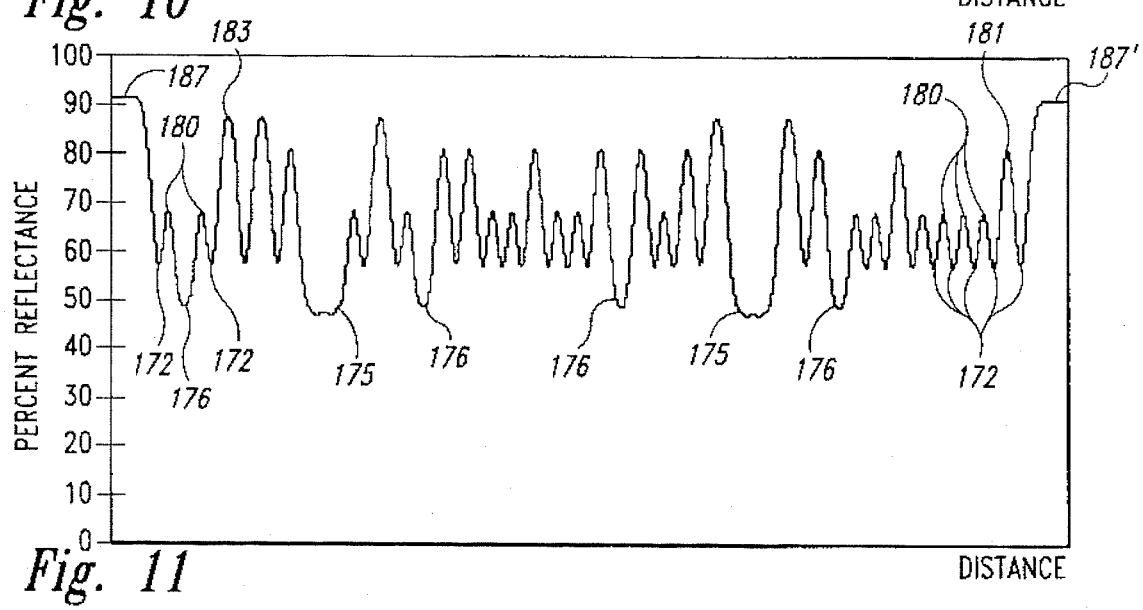
FIG. 11 is a bar code profile produced by the reading apparatus of FIG. 1 from the symbol of FIG. 2 where the aperture size is 2.8 times the X-dimension.
Figure 15:
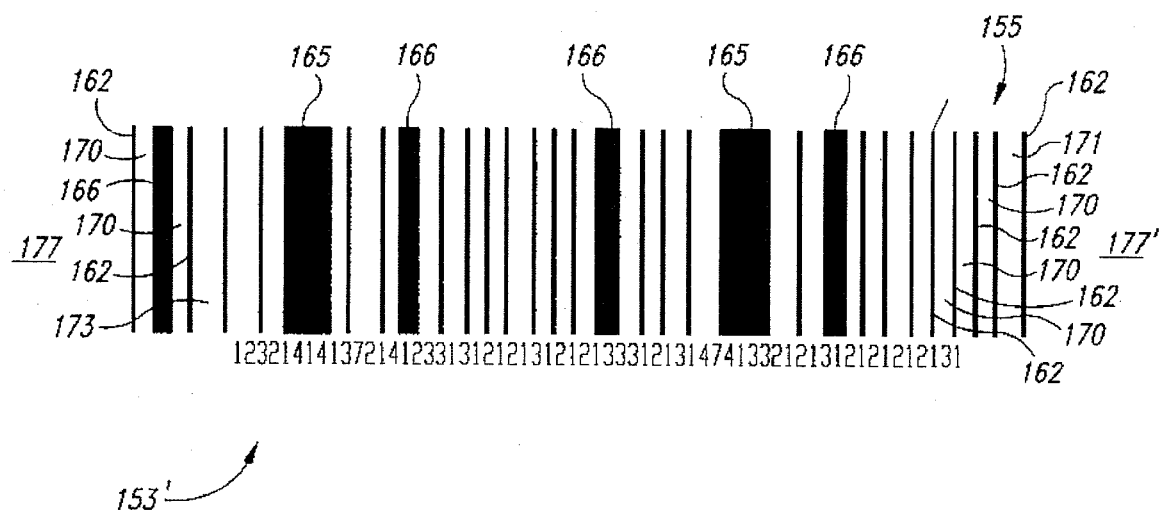
FIG. 15 is a pictorial representation of elements as the waveshaping circuit of the reading apparatus of FIG. 1 interprets the profile of FIG. 8, with the corresponding element widths listed below the pictorial representation.

Considering now an out-of-focus example, as the symbol 153 becomes unresolved, the groups or clusters of 1-wide bars 162 and adjacent 1-wide spaces 169 produce flattened valleys 175 and 176 in the profile of FIG. 9. The waveshaper and counting circuits 142 interpret the valleys 175 and 176 as wide bars. A symbol 153' shown in FIG. 15 is a representation of a bar and space pattern as the waveshaper and counting circuits 142 interpret the profile of FIG. 9.

The symbol 153' is not a symbol produced from a known bar code symbology. The two 1-wide bars 162 bordering the 1-wide space 169 in the Start 0 character 154 produce the valley 176 in the profile of FIG. 9, which is interpreted by the waveshaper and counting circuits 142 as a pseudo 3-wide bar 166 in the symbol 153'. Similarly, the symbol 153 contains two instances of four 1-wide bars 162 that separate three 1-wide spaces 169, which produce the wide flattened valleys 175. The waveshaper and counting circuits 142 interpret the valleys 175 as pseudo 7-wide bars 165 as shown in the symbol 153'.

A "pseudo-element" is a wide element which is invalid for the symbology from which the symbol was generated. For example, in the Code 53 symbology, no wide bars exist. Pseudo-elements correspond to clusters of adjacent 1-wide elements that occur only as groupings of an odd number of 3 or greater 1-wide elements. Therefore, pseudo-elements in the Code 53 symbology correspond to a 1-wide space between two 1-wide bars (a pseudo 3-wide bar), two 1-wide spaces separated by three 1-wide bars (a pseudo 5-wide bar), three 1-wide spaces separated by four 1-wide bars (a pseudo 7-wide bar) and so forth. As will be seen below, since pseudo-elements occur only in odd multiples of the X-dimension, the present invention may decode out-of-focus symbols with a high degree of tolerance.

Figures 16A, 16B:
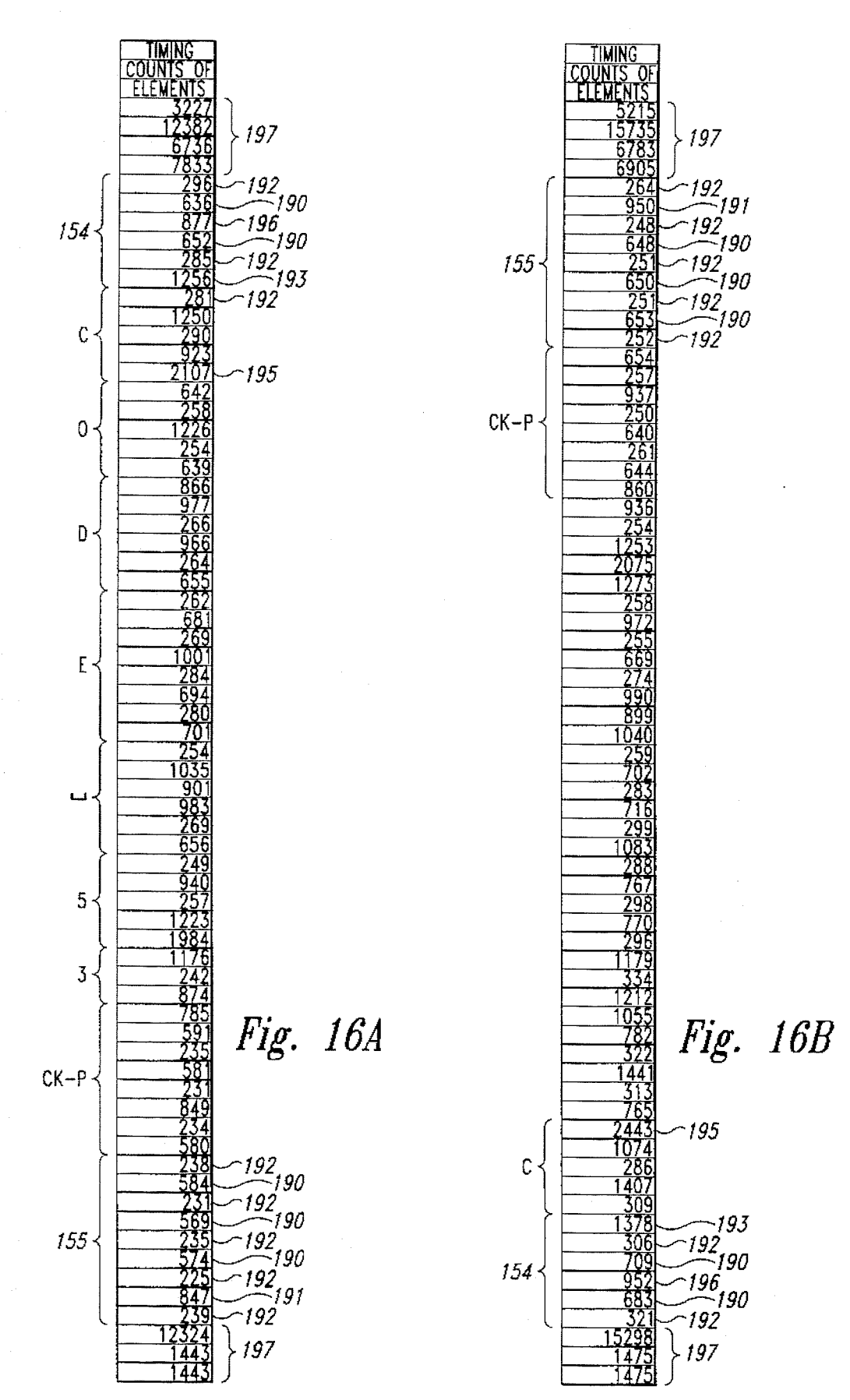

FIG. 16A shows a series of timing counts produced by the waveshaper and counting circuits 142 based on the profile of FIG. 9. FIG. 16B shows a series of counts produced by a reverse scan. As shown in FIG. 16A, the valleys 172, generated by the 1-wide bars 162, still produce the 1-wide bar counts 192 that have substantially the same value (about 285 at the beginning of the scan and about 235 at the end of the scan). The valley 176 (FIG. 9), however, produces a 3-wide bar timing count 196 of 877 (FIG. 16A), which is interpreted as the 3-wide pseudo bar 166 (FIG. 15). The Stop character 155 in the Code 53 symbology, however, remains resolved even when out-of-focus. The valleys 172 and peaks 180 and 181 on the right side of the profile of FIG. 9 produce the 1-wide bar counts 192, the 2-wide space counts 190 and the 3-wide space count 191, respectively, in FIG. 16A. As a result, the CPU 144 can recognize the Stop character 155 even when it is out-of-focus because the electro-optical device 141 still produces a resolved profile from this symbol character, and thus the waveshaper and counting circuits 142 produce well-behaved counts.

In FIGS. 14A, 14B, 16A, and 16B, only certain counts are indicated by reference numerals. However, based on the symbol 153, the profile of FIG. 3 and the series of counts of FIG. 14A, one can sequentially match from left to right the series of elements in the symbol with the peaks and valleys in the profile and the individual counts. Conversely, one can sequentially compare from right to left, the elements of the symbol 153 to the peaks and valleys of the profile of FIG. 3 with the counts in FIG. 14B. Similar matching can be performed between the counts of FIGS. 16A and 16B, the profile of FIG. 9 and the symbol 153' of FIG. 15. For many groups of counts in FIGS. 14A, 14B, 16A, and 16B, braces and an adjacent data character indicate to which data character in the symbol 153 the particular group of counts corresponds. For example, in FIG. 14A, the first two groups of eight counts following the Start 0 character 154 are indicated by the data characters "C" and "O," respectively.

Figure 17A:
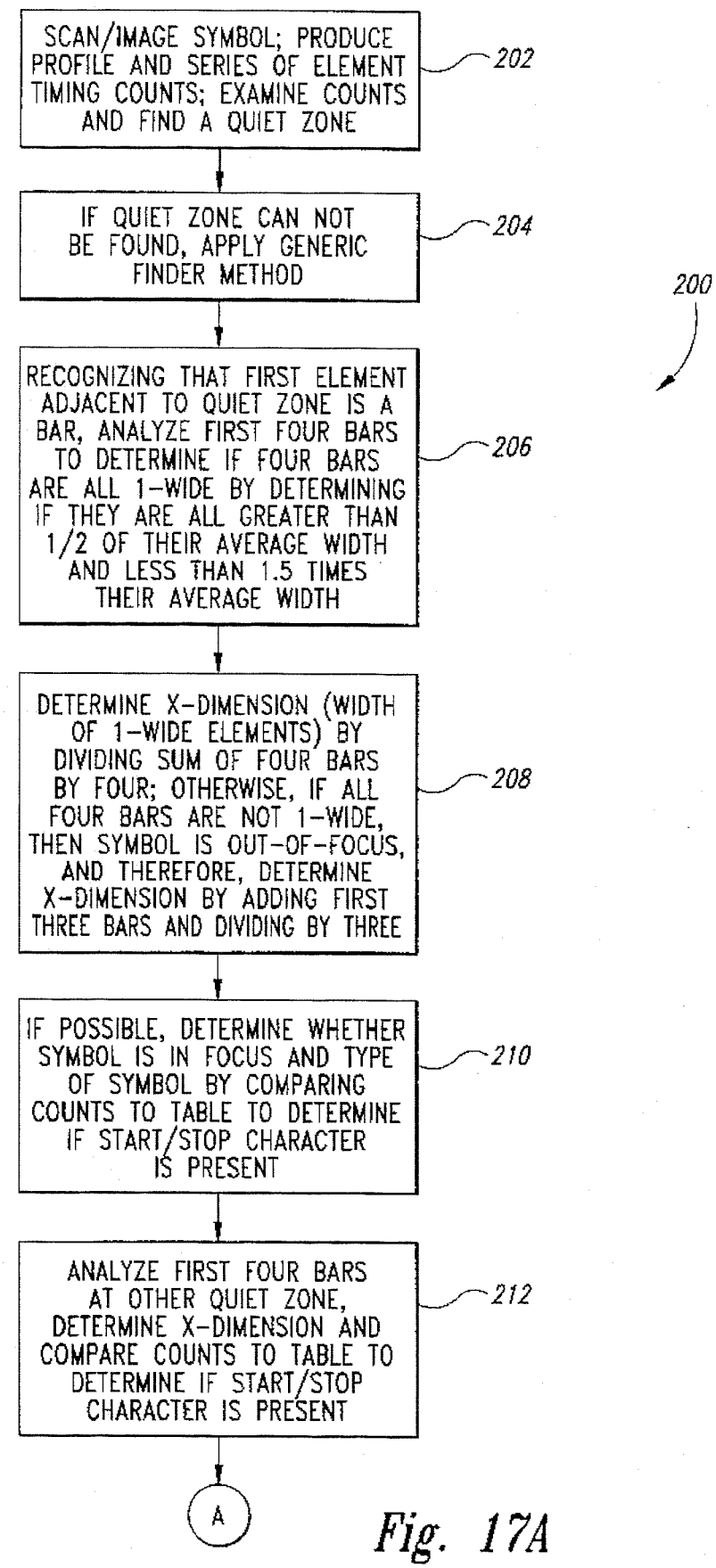
FIGS. 17A and 17B together show a flow chart of the basic steps performed by the reading apparatus of FIG. 1 for reading and decoding bar code symbols under the method of the present invention.
Figure 17B:
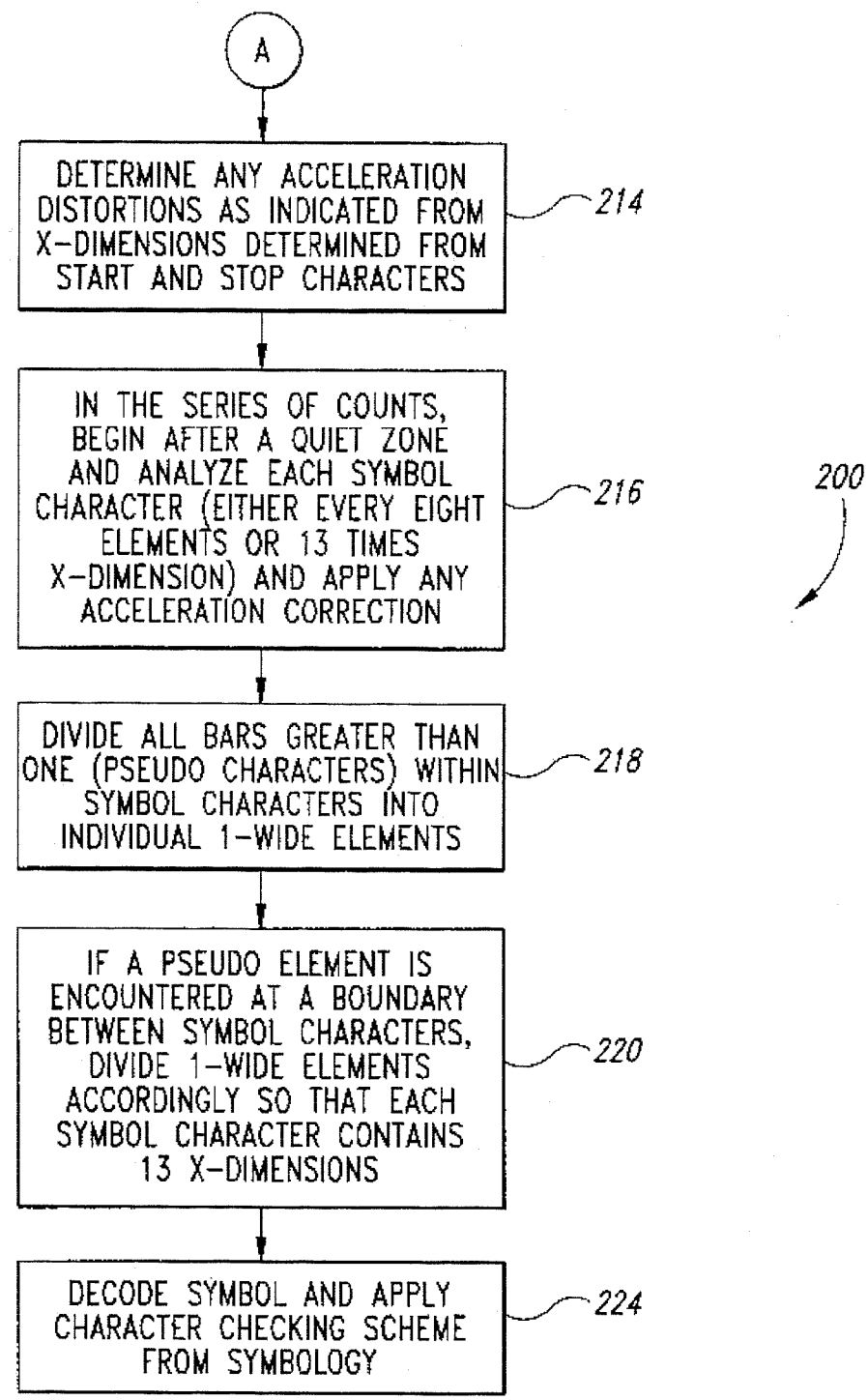

Referring now to FIGS. 17A and 17B, a routine 200 for decoding unresolved profiles under the present invention begins in step 202 (FIG. 17A) where the CPU 144 causes the electro-optical device 141 to scan or image the symbol 153 to produce a profile. The waveshaper and counting circuits 142 then produce a series of counts based on the profile. The routine 200, and all routines and methods described herein, are generally performed by the CPU 144 and are permanently stored within the memory 146.

In step 202, the CPU 144 examines the series of counts to find the left or right quiet zones 177 and 177', respectively, that precede or succeed the symbol 153. As shown in FIG. 14A, the left quiet zone 177 produces a left quiet zone count 197. The CPU 144 identifies the quiet zone by locating a count that is about 10 times greater than counts that follow thereafter. For example, the left timing zone count a 197 of 7816 is a more than ten times greater than the counts that follow thereafter, i.e., the counts for the Start 0 character 154. The CPU 144 in step 202 can similarly locate the right quiet zone 177' from a right quiet zone count 197' of 5157 in FIG. 14B from the reverse scan of the symbol 153.

Generally, the steps of the routine 200 (and other routines described herein) are applied to the series of counts of FIG. 14A only. Based on the example of FIG. 14A, one can, if desired, similarly apply the same steps to the series of counts in FIGS. 14B, 16A, or 16B. As shown below, however, certain steps are applied to the counts of FIGS. 14B, 16A, or 16B to help clarify aspects of the present invention.

Figure 18A:
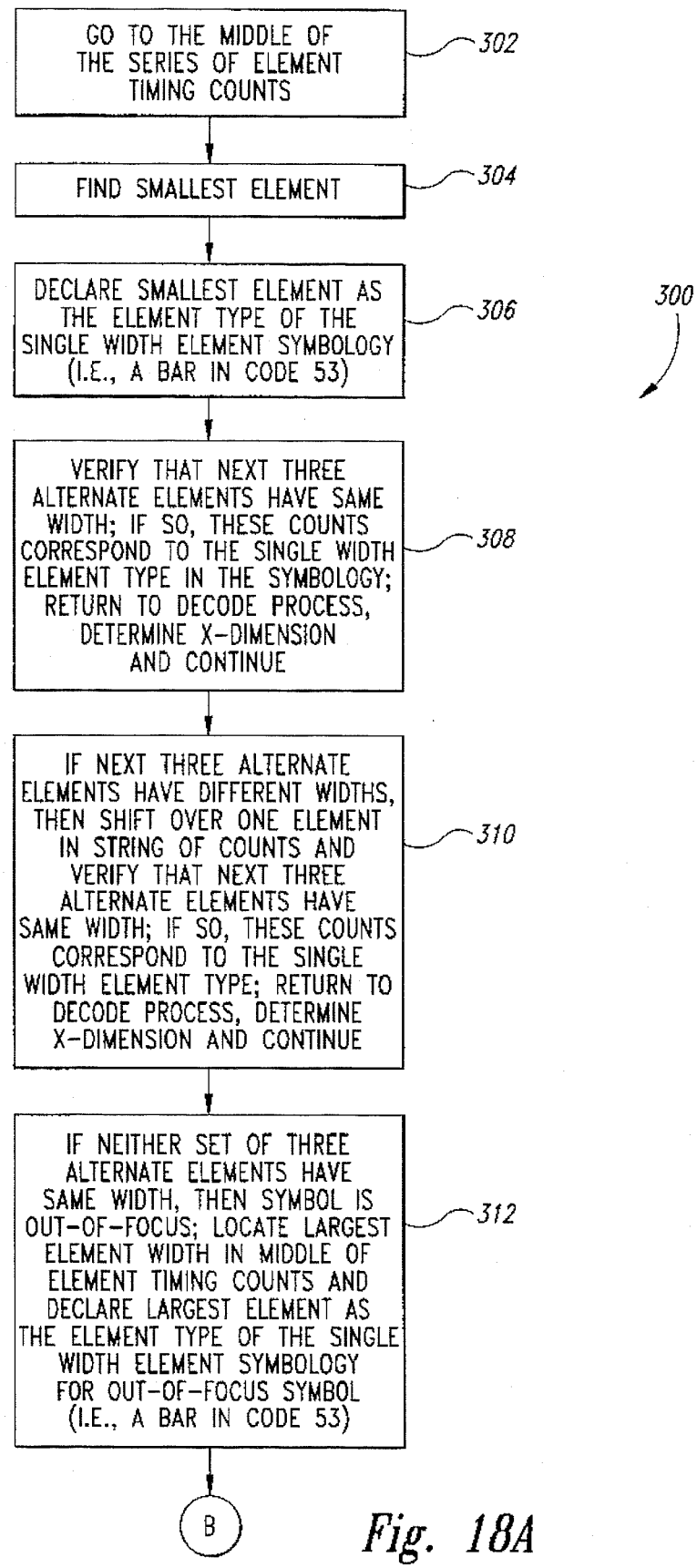
FIGS. 18A and 18B together show a flow chart of a generic element finder method performed by the reading apparatus of FIG. 1.
Figure 18B:
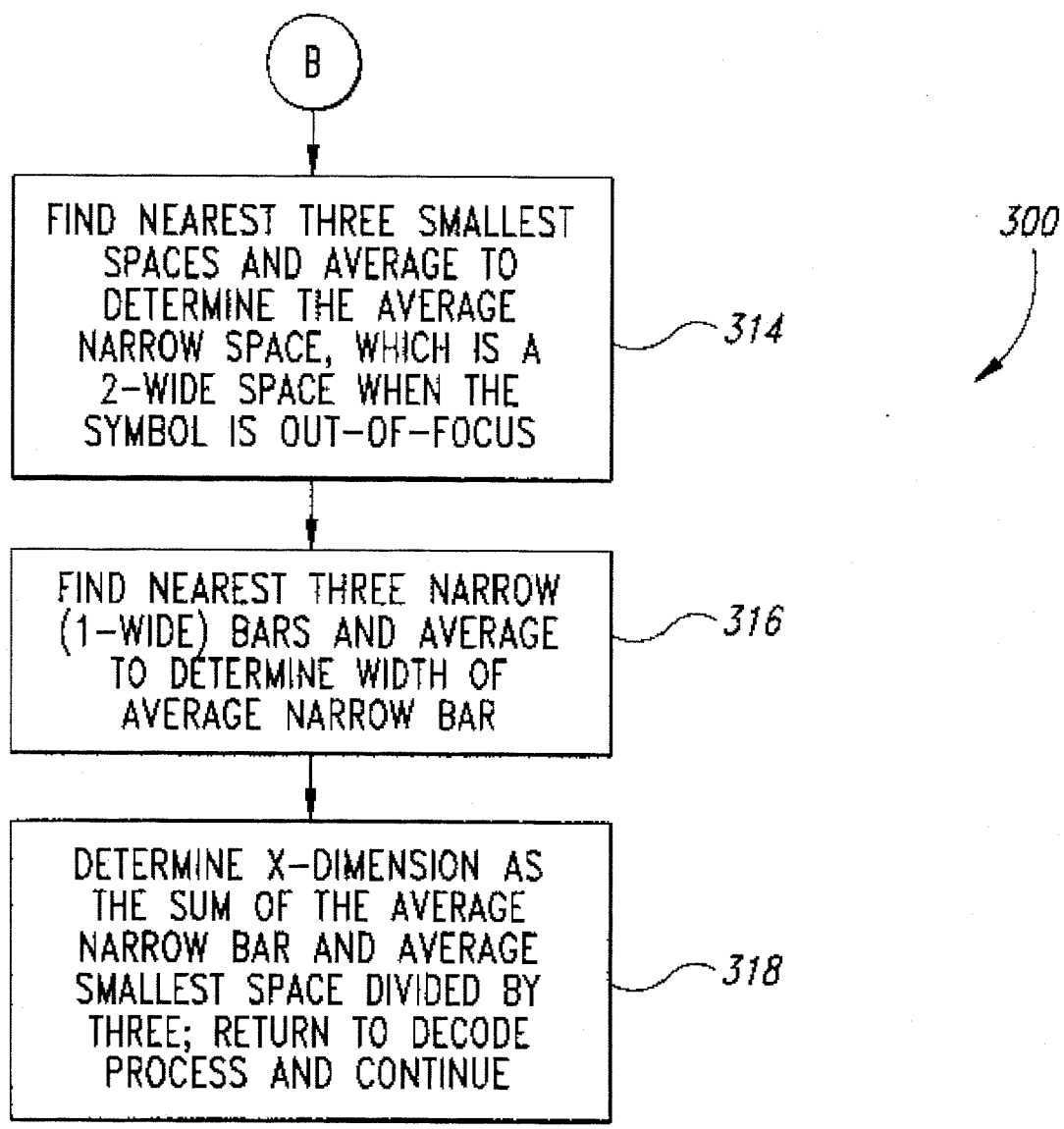

In step 204, if the CPU 144 cannot locate one of the quiet zones from the series of counts, then the CPU performs a generic element finder routine 300 discussed below with respect to FIGS. 18A and 18B. Assuming the CPU 144 locates the left quiet zone 197, then in step 206, the CPU recognizes that the first count following the quiet zone corresponds to a bar since it represents a transition from the quiet zone (a space) to the first element in the symbol 153 which must be a bar. Therefore, every other count following the left or right quiet zone count 197 and 197' respectively, corresponds to bars in the symbol 153. In step 206, the CPU 144 analyzes the first four alternate counts to determine if they all are substantially similar and correspond to 1-wide bars 162 by employing any number of known algorithms that determine whether several counts are substantially similar. For example, the CPU 144 in step 206 determines if each of these counts are greater than one half of their average and less than 1.5 times their average. In other words, the CPU 144 in step 206 determines whether the widths of the first four bars in the symbol 153 are greater than one half of their average width and less than 1.5 times their average width.

For the in-focus counts of FIG. 14A, the first four alternate counts, following the quiet zone count 197, are 326, 324, 289 and 289. These counts are all greater than one-half their average and less than 1.5 times their average, and therefore, all correspond to 1-wide bars 162. For the out-of-focus counts of FIG. 16A, however, the first four alternate counts are 296, 877, 285, and 281. The second count of 877 corresponds to the 3-wide bar count 196 for the 3-wide pseudo bar 166. The count of 877 is greater than 1.5 times their average, and therefore, the CPU 144 recognizes that the counts of FIG. 16A correspond to counts produced from an unresolved profile.

In step 208, the CPU 144 determines an X-dimension (i.e., a width of the 1-wide elements) by dividing a sum of the first four bar counts 192 by four if the first four alternate counts are all greater than one half their average width and less than 1.5 times their average. For the counts of FIG. 14A, the CPU 144 in step 208 produces an average X-dimension from the Start 0 symbol 154 of:

(326+324+289+289)/4=307.

If the first four alternate counts are not greater than one-half their average and less than 1.5 times their average, then the CPU 144 recognizes that the symbol 153 is out-of-focus, as represented by the symbol 153'. As shown in FIG. 16A, the second alternate count of 877 is greater than 1.5 times the average width of the first four bar counts. Therefore, in step 208 the CPU 144 ignores this count and averages the first three bar counts that are greater than one half their average and less than 1.5 times their average to produce an X-dimension of:

(296+285+281)/3=287.

In step 210, the CPU 144 determines whether the symbol 153 is in focus and the type of symbol (i.e., from which symbology the symbol belongs) by comparing the first eight series of counts to a look-up table to determine if the counts match to a start or stop character from a known symbology. The memory 146 preferably includes a look-up table for the Code 53 symbology, which indicates that the Start 0 character 154 consisting of the series of element widths 12111214. The CPU 144 analyzes each of the first eight counts in FIG. 14A, following the quiet zone count 197, to determine what element width each of the counts corresponds to based on the X-dimension determined in step 208 above. Table 1 below shows an example of a method by which the CPU 144 compares counts to multiples of the X-dimension to determine the width of an element in the symbol 153.

TABLE 1

Estimate of Element Widths Based on Counts and X-Dimension

| Count = 1-wide element if: | Count >0.5 X-dimension and <1.5 X-dimension |
| Count = 2-wide element if: | Count >1.5 X-dimension and <2.5 X-dimension |
| Count = 3-wide element if: | Count >2.5 X-dimension and <3.5 X-dimension |
| . | . |
| . | . |
| . | . |

The CPU 144 in step 210 recognizes that the first count 326 corresponds to a 1-wide element (i.e., it is approximately equal to the X-dimension of 307), while the second count of 687 corresponds to a 2-wide element (approximately two times the X-dimension or 314). The subsequent counts of 324, 352, 289, 711, 289 and 1335 correspond to element widths of 1, 1, 1, 2, 1 and 4. Therefore, the CPU 144 determines a series of elements widths based on the first eight counts, compares these widths to the look-up table in the memory 146, and determines that the first eight counts in FIG. 14A correspond to the Start 0 character 154 in the Code 53 symbology. Based on other element width strings stored in the memory 146, the reader 140 can automatically discriminate between other symbologies.

In step 212, the CPU 144 locates the other quiet zone 177 from the series of counts (i.e., at the end of the series of counts), averages the first four bars adjacent to the other quiet zone count, and determines another X-dimension for the symbol 153. Therefore, for the counts of FIG. 14A, the CPU 144 locates the right quiet zone 177' from the right quiet zone count 197'. Thereafter, the CPU 144 averages the first four bars having counts 245, 235, 239 and 233 to determine an estimated X-dimension of 238. The CPU 144 compares the series of counts preceding the right quiet zone count 197' to the look-up table stored in the memory 146 to confirm that the series of counts corresponds to the Stop character 155.

In step 214 (FIG. 17B), the CPU 144 determines whether the profile produced from the symbol 153 included acceleration distortions. The CPU 144 compares the X-dimension determined in step 208 to the X-dimension determined in step 212. If the X-dimensions differ, then the profile produced from the symbol 153 included acceleration distortions. For the exemplary counts of FIG. 14A, the X-dimension determined above in step 208 of 307 differs from the X-dimension determined above in step 212 of 238, and therefore, the CPU 144 determines that a slight deceleration distortion occurred when the electro-optical device 141 produced the profile of FIG. 3. If the CPU 144 detects acceleration or deceleration distortions ("acceleration distortion" generally) in step 214, the CPU computes an appropriate acceleration distortion compensation factor using methods and subroutines known by those skilled in the art.

In step 216, the CPU 144 begins after one of the left or right quiet zone count 197 or 197', and analyzes each symbol character as groups of eight counts corresponding to eight elements, or groups of 13 times the X-dimension, and determines a series of eight element widths for the symbol character. The CPU 144 also applies any acceleration correction factor to ensure that each element width is correctly determined.

For example, for the first data character "C" in the series of counts of FIG. 14A, the CPU 144 in step 216 analyzes the eight series of counts following the Start 0 character 154 of 311, 1318, 302, 988, 306, 335, 309, and 350. The CPU 144 examines the counts and estimates a width of the element in the symbol 153 that produced the count based on Table 1 above. For example assuming for simplicity an estimated X-dimension, without any acceleration distortion compensation, of 272.5, the first count of 311 is greater than one-half the average X-dimension and less than 1.5 times the X-dimension. Therefore, the CPU 144 determines that the first count of 311 corresponds to a 1-wide element (a bar). The next count of 1318 is greater than 3.5 times the X-dimension and less than 4.5 times the X-dimension, therefore, corresponds to a 4-wide element (a space).

If the CPU 144 is unable to determine the width of an element from the count within a reasonable margin of error, then the CPU analyzes each symbol character based on 13 times the X-dimension. For the first 13 X-dimensions following the Start 0 character 154, the CPU divides each count by the estimated X-dimension to parse 13 X-dimensions for a single symbol character. Table 2 below is an example of how the CPU 144 selects 13 X-dimensions following the Start 0 character 154.

TABLE 2

| Count | Divided by X-Dimension | = No. of X-Dimensions |
|---|---|---|
| 311 | ÷272.5 | 1 |
| 1318 | ÷272.5 | 4 |
| 302 | ÷272.5 | 1 |
| 988 | ÷272.5 | 3 |
| 306 | ÷272.5 | 1 |
| 355 | ÷272.5 | 1 |
| 309 | ÷272.5 | 1 |
| 350 | ÷272.5 | 1 |
| Total Number of X-dimensions | | 13 |

FIG. 14A shows the remaining groups of eight counts parsed into their corresponding data characters of "O", "D", "E", "[space]", "5", and "3", and the check character CK (corresponding to the data character "P"). FIG. 14B similarly shows several groups of eight counts parsed into data characters (but, of course, in reverse order from those of FIG. 14A).

The counts of FIG. 14A and 14B correspond to counts generated when symbol 153 is in focus. FIGS. 16A and 16B, however, correspond to counts generated when the symbol 153 is out-of-focus. Therefore, the series of counts includes counts corresponding to pseudo-elements. In the series of counts of FIG. 16A, the CPU 144 in step 216 analyzes the first eight counts, following the left quiet zone count 197, of 296, 636, 877, 652, 877, 652, 285, 1256, 281, and 1250. Based on table 1, the CPU 144 determines that these eight counts correspond to the following series of element widths: 1,2,3,2,1,4,1 and 4.

The CPU 144 recognizes that the string of element widths do not correspond to a valid character in the Code 53 symbology. By dividing the counts into X-dimensions, the CPU 144 also recognizes that the string of element widths is equal to 18 times the X-dimension. Table 3 below demonstrates the number of X-dimensions.

TABLE 3

| Count | Divided by X-Dimension | = No. of X-Dimensions |
|---|---|---|
| 296 | ÷272.5 | 1 |
| 636 | ÷272.5 | 2 |
| 877 | ÷272.5 | 3 |
| 652 | ÷272.5 | 2 |
| 285 | ÷272.5 | 1 |
| 1256 | ÷272.5 | 4 |
| 281 | ÷272.5 | 1 |
| 1250 | ÷272.5 | 4 |
| Total Number of X-dimensions | | 18 |

Under the Code 53, all symbols (except the Stop character) have a width of 13 times the X-dimension. Therefore, the CPU 144 recognizes that the string of element widths does not correspond to a valid symbol character.

Therefore, in step 218, the CPU 140 divides all counts that correspond to bars greater than 1 within the string of counts into individual 1-wide elements. Therefore, knowing that every other count must correspond to a 1-wide bar, and therefore must be approximately equal to the X-dimension, the CPU 144 sequentially analyzes and divides all alternate counts not equal to the X-dimension into 1-wide elements. Analyzing the first six counts, following the left quiet zone count 197, the CPU 144 in step 218 recognizes that the third count of 877 should correspond to a 1-wide bar, and therefore should be equal to approximately 272.5 (the exemplary X-dimension). Dividing the count of 877 by the X-dimension, the CPU 144 divides the count into three X-dimensions (the 1-wide space 169 between the 1-wide bars 162 in the Start 0 character 154 (FIG. 2)).

Occasionally, a pseudo-element will occur between two symbol characters. Therefore, in step 220 the CPU 144 divides out all 1-wide elements in a pseudo-element encountered between two symbol characters so that each of the symbol characters contains 13 X-dimensions. For example, analyzing the next five counts of 281, 1250, 290, 923 and 2107 in FIG. 16A, the CPU 144 in step 220 determines that the count of 2107 corresponds to three 1-wide spaces separated by four 1-wide bars. Therefore, the count 2107 corresponds to seven elements. As the CPU 144 gathers eight elements that total 13 times the X-dimension for each symbol character, the CPU recognizes that the counts 281, 1250, 290 and 923 correspond to four elements having widths of 1, 4, 1 and 3. Therefore, four of the seven X-dimensions embodied in the count of 2107 correspond to four elements for the first symbol character, while the remaining three X-dimensions in the count of 2107 correspond to elements for the next symbol character. In other words, the first symbol character consists of the elements having widths of 1, 4, 1, 3, 1, 1, 1, and 1, while the first three element widths in the second symbol character are 1,1, and 1. The first group of counts, following the Start 0 character 154, corresponds to the data character "C," while the second group of counts corresponds to the "O" data character, as shown in FIG. 16A. The CPU 144 in steps 216, 218 and 220 continues through the series of counts of FIG. 16A to identify all bars as 1-wide bars or pseudo-elements. The pseudo-elements are then broken up into their respective 1-wide elements and each pseudo-element at a boundary between two symbol characters is further divided between symbol characters.

After determining the widths of the elements from the series of counts, the CPU 144 in step 224 decodes the symbol into data characters by comparing each series of eight element widths to the look-up table in memory 146. In step 224, the CPU 144 also applies the appropriate character checking scheme for the symbology, if any, using any check characters in the symbol to verify the decoded data characters to verify the decoded data characters. For example, the CPU 144 applies the error detecting method described in the inventors' above-referenced U.S. Patent Application and compares the result to the check character CK. If any other error detecting methods or error correcting characters have been added to the symbol, then the CPU 144 in step 224 performs the appropriate checking/error correcting algorithms. The decoded data characters can then be output over the line 149 to the host computer 151 or an appropriate application.

At times, the left and right quiet zones 177 and 177' can be noisy, or due to other factors, the left and right quiet zone count 197 and 197' could be difficult to locate in the series of counts. For example, the waveshaper and counting circuits 142 can produce count from the quiet zone that is not approximately ten times greater than the smallest count in the series of counts. Therefore, the CPU 144 performs the routine 300 to locate the 1-wide bars in the series of counts for the Code 53 symbology (or the single width element for other single width symbologies). Referring to FIG. 18A, the CPU 144, having failed to locate the quiet zone in step 204 (FIG. 17A), goes to the middle of the series of counts to locate the 1-wide bars in the series of counts the CPU 144 jumps to the middle of the series of counts because the middle of the counts most likely corresponds to counts produced from a symbol (rather than noise, etc.).

The CPU 144 recognizes that, following the left or right quiet zone count 197 and 197', the first element corresponds to a bar and alternate elements thereafter similarly correspond to bars. Likewise, the first count following the first bar, and all alternate counts thereafter, correspond to spaces. However, if the CPU 144 begins within the middle of the counts, the CPU is initially unable to determine whether a selected count corresponds to a bar or a space.

Therefore, in step 304, the CPU 144 finds the smallest count in the middle of the series of counts which corresponds to the smallest element from the symbol 153. Referring to the counts of FIG. 16A, the CPU 144 in step 304 finds the count of 269 (within the series of counts corresponding to the data character "E"). In step 306, the CPU 144 declares that the count of 269 corresponds to the 1-wide element type of the single-width symbology (i.e., a bar in the Code 53 symbology).

In step 308, the CPU 144 verifies that the count 269 corresponds to the smallest element by verifying that the next few (e.g., three) alternate elements have approximately the same width. Therefore, the CPU 144 recognizes that the next alternate counts are equal to 284. 280 and 254, which are substantially similar to the initially selected count of 269. Consequently, in step 308, the CPU 144 confirms that the count of 269 corresponds to the 1-wide bars in the symbol 153, and that every other count also corresponds to a bar. The CPU 144 therefore returns to step 208 in the decode routine 200, determines an X-dimension, attempts to locate the start and Stop characters, and so forth.

If the symbol 153 is out-of-focus, then all of the 1-wide spaces will be lost. Therefore, by locating the smallest count in the middle of the series of counts, the CPU 144 invariably locates the 1-wide bars in the symbol from the series of counts. The CPU 144 analyzes the three closest alternate counts because they will likely have the least amount of acceleration distortion.

However, the CPU 144 does not determine at this time whether the symbol is in focus. Therefore, if the symbol 153 is in-focus, but has noisy quiet zones, the CPU 144 in step 308 could initially select a count that corresponds to a space. For example, if the CPU 144 selects the count 335 in the series of counts of FIG. 14A (within the data character "5"), and analyzes the next three alternate counts, the following string of counts results: 339, 348 and 1227. The CPU 144 in step 308 recognizes that the third alternate count of 1227 is not substantially equal to the initially selected count of 335. Consequently, in step 310, the CPU 144 shifts over one count (i.e., one element) in the string of counts and verifies that the next string of three alternate counts have the same width. Selecting the count of 271, and analyzing the next three alternate counts of 258. 253 and 262, the CPU 144 in step 310 confirms that the second selected count of 271 corresponds to a 1-wide bar in the series of counts of FIG. 14A. Thereafter, in step 310, the CPU 144 returns to step 208 in the decode routine 200, estimates the X-dimension, attempts to locate the start and Stop characters, and so forth.

If the symbol 153 is out-of-focus, then the CPU 144 cannot always locate the 1-wide bars in the middle of the series of counts. For example, if the CPU 144 initially selected the count of 269 in FIG. 16A (within the "space" data character), the next three alternate counts are 249, 257 and 1984. As a result, in step 312, the CPU 144 then locates the largest element width in the middle of the timing counts. If the symbol 153 is out-of-focus, then the largest element within the series of timing counts likely corresponds to a pseudo-element consisting of 1-wide spaces separated by 1-wide bars. Therefore, analyzing the series of element counts for the largest count, the CPU 144 in step 312 locates the count of 1984 (between the data characters "5" and "3") and declares the count of 1984 as being a bar in the Code 53 symbology. For other symbologies, such as symbologies employing only 1-wide spaces, then the CPU in step 312 would declare the largest element within the series of elements as a space.

In 314, the CPU 144 locates the three nearest, smallest counts corresponding to spaces and averages these to determine the average narrow space, which is a 2-wide space when the symbol is out-of-focus. Therefore, the CPU 144 averages the counts of 591, 581 and 580 in the series of counts of FIG. 16A to determine an average width of 584 for the 2-wide spaces in the out-of-focus symbol 153'. In step 316, the CPU 144 locates the three nearest smallest counts corresponding to 1-wide bars and averages these to determine the width of the average narrow bar. Therefore, from the initially selected count of 1984, the CPU averages the bar counts of 242, 235 and 231 in step 316 to determine an average width of 236 for the 1-wide bars.

In step 318, the CPU 144 determines an estimated X-dimension of 273.3 for the symbol as a sum of the average narrow bar and the average narrow space divided by three (the 2-wide space plus the 1-wide bar divided by three equals the estimated X-dimension). Thereafter, the CPU 144 returns to step 210 in the decode routine 200, attempts to locate the start and stop characters based on the X-dimension computed in step 318, and so forth.

As explained above, the present invention provides a method and apparatus for decoding out-of-focus symbols from single width symbologies using standard waveshaping and counting circuits 124. Profiles produced from out-of-focus symbols resolve the single (1-wide) elements of the symbology (such as the bars in the Code 53 symbology) as either 1-wide elements or pseudo elements. Standard waveshaping and counting circuitry, coupled with a standard CPU, can decode the symbol since the pseudo bars can be readily divided into an odd number of alternating 1-wide bars and spaces. The present invention has generally been described above in terms of decoding out-of-focus symbols under one exemplary routine. However, other decoding routines or steps can be used instead. For example, all of the counts corresponding to spaces can be examined separately from the counts corresponding to bars. As a result, the CPU 144 compares counts of like elements to determine their widths. The present invention can also employ other known decoding methods, such as edge-to-edge (element pairs) decoding for individual elements in the symbol 153, Factor R decoding methods, normalization, and so forth.

While the detailed description above has been expressed, in part, in terms of specific examples, those skilled in the art will appreciate that many other variations could be used to accomplish the purpose of the disclosed invention. Those skilled in the art will recognize that the present invention is usable in numerous other data character encoding applications, and is adaptable for use with any other single width symbology, and readers of those symbologies. While the present invention has been described above with respect to a method performed by the CPU 144, the routines 200 and 300 can be implemented using appropriate circuitry, such as logic gates. Accordingly, it can be appreciated that various equivalent modifications of the above-described embodiments may be made without departing from the spirit and scope of the invention. Therefore, the present invention is limited only by the following claims.

I claim:

1. A method of decoding a bar code symbol representing a plurality of characters, the bar code symbol including a plurality of relatively spaced bars having a first width, and spaces between the bars having the first width, one of the bars and the spaces having wide elements that have at least a second width, while the other of the bars and spaces have only the first width, the second width being greater than the first width, the method of decoding the bar code symbol comprising the steps of:

receiving light reflected from the bar code symbol and producing an output signal therefrom that represents a reflectance of the bars and spaces comprising the bar code symbol;

receiving the output signal and producing a count signal having a series of counts that identifies at least some of the wide elements, and which falsely identifies at least one group of the bars and spaces having the first width as a pseudo wide element having a total width approximately equal to a sum of the first widths of the bars and spaces in the at least one group;

determining a narrow width of the bars and spaces having the first width based on the count signal;

dividing the pseudo wide element by the narrower width to identify the bars and spaces having the first width in the at least one group; and determining the information encoded in the bar code symbol based on the count signal and the bars and spaces having the first width divided from the pseudo wide element.

2. The method of claim 1 wherein the bar code symbol includes a quiet zone adjacent to a first bar in the bar code symbol, and wherein the step of determining a narrow width of the bars and spaces having the first width includes the step of locating, from the series of counts in the count signal, the quiet zone adjacent to the first bar.

3. The method of claim 2 wherein the step of determining a narrow width of the bars and spaces having the first width includes the steps of:

selecting several alternate counts in the count signal proximate to the quiet zone; and averaging the several alternate counts to determine the narrow width.

4. The method of claim 3 wherein the step of selecting several alternate counts only selects counts that are greater than a first predetermined value and less than a second predetermined value.

5. The method of claim 2 wherein the step of determining a narrow width of the bars and spaces having the first width includes the steps of:

identifying start or stop characters in the bar code symbol based on certain counts in the count signal that are proximate to the quiet zone;

selecting several alternate counts from the certain counts, in the count signal;

determining if the selected several alternate counts in the count signal are approximately equal;

determining that the bar code symbol is out-of-focus if all of the selected several alternate counts are not equal; and averaging only the several alternate counts that are approximately equal to determine the narrow width.

6. The method of claim 2, further comprising the steps of:

determining that the quiet zone cannot be located from the series of counts;

selecting a count in a middle of the series of counts; and determining if the selected count corresponds to the other of the bars and spaces having only the first width.

7. The method of claim 6 wherein the step of selecting a count in a middle of the series of counts selects a count having a small value compared to counts proximate to the selected count, and wherein the step of determining if the selected count corresponds to the other of the bars and spaces having only the first width includes the steps of:

examining several alternate counts following the selected count;

determining whether the several alternate counts are approximately equal to the selected count; and confirming that the selected count corresponds to the other of the bars and spaces having only the first width if the several alternate counts are approximately equal to the selected count.

8. The method of claim 7, further comprising the steps of:

determining that the several alternate counts are not approximately equal to the selected count;

examining an adjacent count adjacent to the selected count and several other counts following the adjacent count;

determining whether the several other counts are approximately equal to the adjacent count; and confirming that the adjacent count corresponds to the other of the bars and spaces having only the first width if the other counts are approximately equal to the adjacent count.

9. The method of claim 8, further comprising the steps of:

determining that the other counts are not approximately equal to the adjacent count: and selecting a new count in the middle of the series of counts as corresponding to the other of the bars and spaces having only the first width, the new count having a large value compared to counts proximate to the new count.

10. The method of claim 9 wherein the step of determining a narrow width of the bars and spaces having the first width includes the steps of:

selecting, in the count signal, several bar counts corresponding to bars in the bar code symbol and several space counts corresponding to spaces in the bar code symbol, the selected bar and space counts being proximate to the new count in the series of counts;

determining a value from the selected bar and space counts; and dividing the value by a predetermined mount to determine the width of the bars and spaces having the first width.

11. The method of claim 2 wherein the step of determining a narrow width includes the steps of:

identifying start and stop characters in the bar code symbol based on start and stop counts in the count signal that are proximate to the quiet zones;

determining a first narrow width of the bars and spaces having a first width based on the start counts in the count signal:

determining a second narrow width of the bars and spaces having the first width based on the stop counts in the count signal;

determining if the count signal includes an acceleration distortion by comparing the first and second narrow widths; and applying a compensation factor to the count signal to compensate for the acceleration distortion if the count signal includes acceleration or distortion.

12. The method of claim 1, further comprising the steps of:

identifying start or stop characters in the bar code symbol based on the count signal; and determining a type of symbology from which the bar code symbol was generated based on the identified start or stop characters in the bar code symbol.

13. The method of claim 12 wherein the step of determining a type of symbology determines that the bar code symbol was generated from the Code 53 symbology, and wherein the other of the bars and spaces having only the first width corresponds to bars.

14. The method of claim 1 wherein the step of dividing the pseudo wide element by the narrow width divides the pseudo wide element into only an odd number of bars and spaces having the first width.

15. The method of claim 1 wherein the step of dividing the pseudo wide element by the narrow width to identify, the bars and spaces having the first width in the at least one group includes the steps of:

dividing the series of counts into separate characters; and if the pseudo wide element falls between two separate characters, then dividing the pseudo wide element into the bars and spaces having the first width between the two characters by dividing the pseudo wide element by the narrow width.

16. A method of decoding a machine-readable symbol representing encoded information, the symbol including a plurality of relatively spaced two-dimensional geometric shapes of first and second types, the shapes of the first type having a first reflectance and the shapes of the second type having a second reflectance differing from the first reflectance, the shapes of the first type having a first width in at least one dimension, and the shapes of the second type having the first width and at least a second width in the one dimension, the second width being greater than the first width, the method of decoding the symbol comprising the steps of:

receiving light reflected from the symbol and producing an output signal therefrom that represents the reflectance of the shapes of the first and second types comprising the symbol;

receiving the output signal and producing a count signal that identifies at least some of the shapes of the second type having the second width, and which falsely identifies at least one group of the shapes of the first and second type having the first width as a pseudo shape of the second type having a total width approximately equal to a sum of the first widths of the one group;

receiving the count signal and dividing the one group falsely identified as the pseudo shape of the second type into shapes of the first and second type; and determining the information encoded in the symbol based on the count signal and the divided one group.

17. The method of claim 16, further comprising the step of determining a width of the shapes of the first and second types having the first width based on the count signal, and wherein the step of receiving the count signal and dividing the one group falsely identified as the pseudo shape divides the single shape by the determined width.

18. The method of claim 16 wherein the symbol includes at least one quiet zone and one of a start and stop character adjacent to the quiet zone, and wherein the step of receiving the count signal and dividing the one group falsely identified as the pseudo shape includes the steps of:

locating the one of the start and stop characters in the count signal by locating counts in the count signal that correspond to the quiet zone, and determining whether the symbol is in-focus based on the located counts corresponding to the one of the start and stop characters.

19. The method of claim 18, further comprising the steps of:

determining that the quiet zone cannot be located from the count signal;

selecting a count in a middle of the count signal; and determining if the selected count corresponds to the shapes of the first type.

20. An apparatus for decoding a machine-readable symbol representing encoded information, the machine-readable symbol including a plurality of relatively spaced two-dimensional shapes of first and second types, the shapes of the first type having a first reflectance and the shapes of the second type having a second reflectance differing from the first reflectance, the shapes of the first type having a first width in at least one dimension, and the shapes of the second type having the first width and at least a second width in the one dimension, the second width being greater than the first width, the apparatus comprising:

an electro-optical transducer that receives light that is reflected from the machine-readable symbol and produces an output signal therefrom that represents the reflectance of the shapes and spaces comprising the symbol;

count generating circuitry coupled to the electro-optical transducer, that receives the output signal and produces a count signal that identifies at least some of the shapes of the second type having the second width, and which falsely identifies at least one group of the shapes of the first and second type having the first width as a pseudo shape of the second type having a total width approximately equal to a sum of the first widths of the one group; and a processor coupled to the count generating circuitry that processes the count signal and produces a signal indicative of the information encoded in the symbol, the processor (i) receiving the count signal and dividing the one group falsely identified as the pseudo shape of the second type into shapes of the first and second type, and (ii) determining the information encoded in the symbol based count signal and the divided one group.

21. The apparatus of claim 20 wherein the processor determines a width of the shapes and spaces having a first width based on the count signal, and divides the one group by the determined width.

* * * * *